United States Patent [19]

Roberts

Best Available Copy

[11] 4,298,873

[45] Nov. 3, 1981

[54] ADAPTIVE STEERABLE NULL ANTENNA PROCESSOR

[75] Inventor: Eugene L. Roberts, Maitland, Fla.

[73] Assignee: The United States of America as represented by the Secretary of the Army, Washington, D.C.

[21] Appl. No.: 222,104

[22] Filed: Jan. 2, 1981

[51] Int. Cl.$^3$ .............................................. H04B 7/00

[52] U.S. Cl. .............................. 343/100 SA; 343/854; 343/100 LE

[58] Field of Search .................. 343/100 SA, 100 LE, 343/100 CL, 113 R, 854

[56] References Cited

U.S. PATENT DOCUMENTS 4,070,675 6/1978 Daniel et al. ................. 343/100 LE

*Primary Examiner*—Theodore M. Blum

*Attorney, Agent, or Firm*—Nathan Edelberg; Jeremiah G. Murray; Edward Goldberg

[57] ABSTRACT

According to the invention, a receive-transmit steerable null antenna processor includes incrementally adjustable delay lines and a variable ratio power network (amplitude balance control) for adjusting the relative phase and amplitude in two or more antenna branches to steer a null on an interference source. A digital controller compares a signal which includes a representation of the interference level to a previously sampled value to note improvement or not and adjusts the delay lines and amplitude balance accordingly.

11 Claims, 18 Drawing Figures

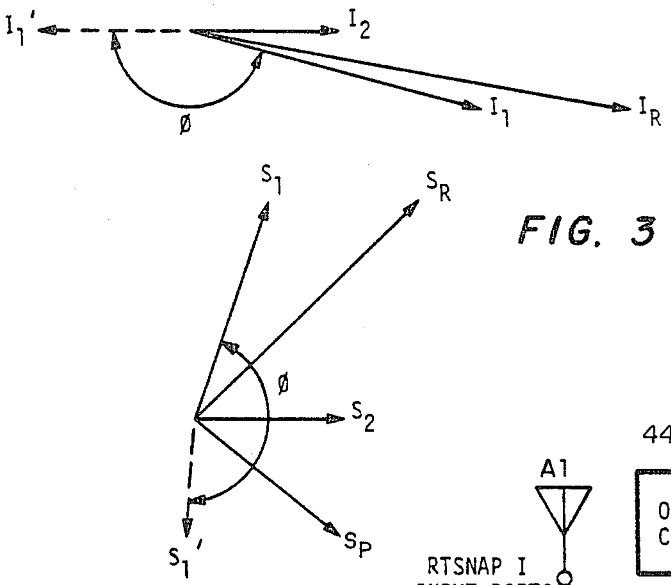
FIG. 3
FIG. 4
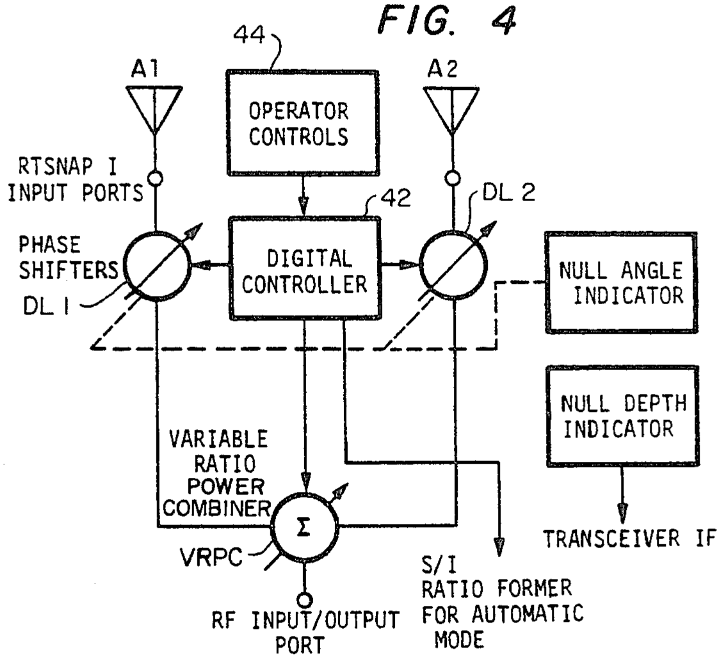
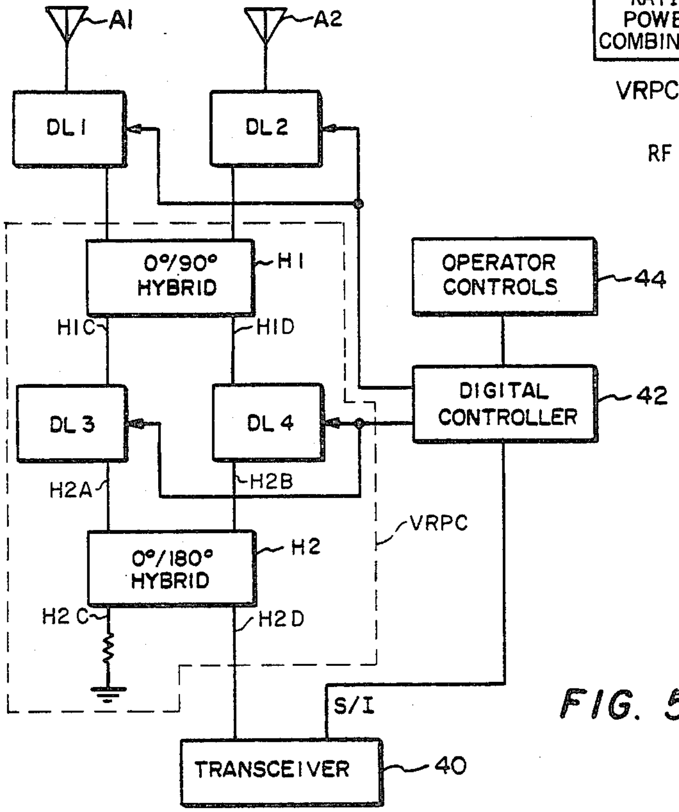
FIG. 5

ADAPTIVE STEERABLE NULL ANTENNA PROCESSOR

Government License

The invention described herein may be manufactured and used by or for the Government for governmental purposes without the payment of any royalty thereon or therefor.

BACKGROUND OF THE INVENTION

1. Field of the Invention

This invention relates to radio receiving and transmitting systems which adaptively suppress interference by controlling the null directivity of the pattern of an antenna array.

2. Description of the Prior Art

Adaptive array antenna systems are currently the subject of intense interest and investigation/development for radar and communications applications. The principal reason for the interest is their ability to automatically steer nulls onto undesired sources of intereference, thereby reducing output noise and enhancing the detectiion of desired signals. These systems usually consist of an array of antenna elements and a realtime adaptive receiver-processor which has feedback control over the element weights.

Communications and radar antenna systems using either conventional narrow band or spread spectrum modulation formats are susceptible to degradation in SNR performance caused by undesired "noise" which intrudes via the antenna sidelobes and mainlobes. The noise may consist of deliberate electronic countermeasures (ECM), friendly RF interference (RFI), clutter scatter returns, and natural noise sources. This degradation is often further aggravated by a motion of the antenna, poor siting conditions, multipath, and a changing interference environment. Adaptive array techniques offer possible solutions to these serious interference problems via their flexible capabilities for automatic null steering and notching in the spatial domain, the frequency domain, and in polarization. Adaptive nulling is considered to be the principal benefit of adaptive techniques at the present time.

A tutorial paper on "Adaptive Arrays—An Introduction" by William F. Gabriel appears in the *Proceedings of the IEEE* Vol. 64, No. 2, Feb. 1976, pages 239–272. U.S. Pat. Nos. of interest include:

3,713,167, David, Class 343797;
3,932,818, Masak, Class 328/167;
3,964,065, Roberts et al., Class 343/100LE;
3,981,914, Masak, Class 343/100LE;
4,024,541, Albanese et al., Class 343/17.1R;
4,064,422, Masak, Class 364/841;
4,097,866, Frost et al., Class 343/100LE;
4,075,633, Lewis, Class 343/100LE;
4,105,977, Fitting et al., Class 325/472.

It is also possible that an unfriendly source of deliberate interference may possess the capability for monitoring the transmissions from the transceiver. It is therefore desirable not only to protect the receiver from the interference, but also prevent information from the transmitter from being intercepted.

The following literature is of interest, and is incorporated by reference.

1. "Application of PIN Diodes", Hewlett Packard Application Note 922.

2. Garver, R.V., "Theory of TEM Diode Switching". Trans IRE. Vol. MTT-9, May 1961, pp. 224–238.

3. "PIN Diode Circuit Design Curves", Microwave Engineers' Handbook, Vol. 2, pp. 174–177, Horizon House Microwave Inc., 1971.

4, Garver, R.V., "Broadband Diode Phase Shifters", IEEE Trans, Vol. MTT-20, No. 5, May 1972, pp. 314–323.

5. "Strip Transmission Lines", Microwave Engineers' Handbook, Vol. 1, pp. 117, Horizon House Microwave, Inc., 1971.

6. Teeter, W. L. and K. R. Bushore, "A Variable Ration Microwave Power Divider and Multiplexer", IRE Trans, Vol. MTT-5; Oct. 1957, pp. 227–229.

7. Vaillancourt, R. M., "Analysis of the Variable Ratio Microwave Divider", IRE Trans, Vol. MTT-6, Apr. 1958, pp. 238–239.

8. Vaillancourt, R. M.,"Optical Hybrid Junction for Millimeter Wavelength", IRE Canadian Convention Records, 1958, pp. 367–374.

9. Mohr, R. J., "Some Design Aspects of Components Utilizing Symmetric 3-dB Hybrids", Microwave Journal, June 1962, pp. 90–94.

SUMMARY OF THE INVENTION

An object of the invention to provide a steerable null antenna processor, in which the null developed during reception is also maintained during transmission.

According to the invention, a receive-transmit steerable null antenna processor includes incrementally adjustable delay lines and a variable ratio power network (amplitude balance control) for adjusting the relative phase and amplitude in two or more antenna branches to steer a null or an interference source. A digital controller compares a signal which includes a representation of the interference level to a previously sampled value to note improvement or not and adjusts the delay lines and amplitude balance accordingly.

BRIEF DESCRIPTION OF THE DRAWING

FIG. 3 is a vector diagram of antenna port signals and processed resultants;

FIGS. 4 and 5 are block diagrams of a system RTSNAP I with two antenna elements;

DETAILED DESCRIPTION

Figure 1:
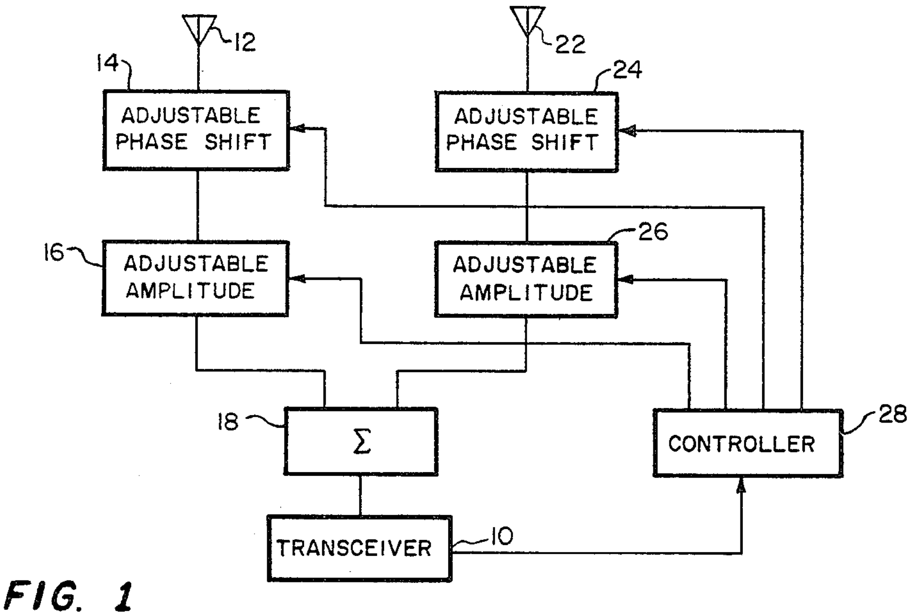
FIG. 1 (Prior Art)
FIG. 1 is a diagram of a basic sterrable null antenna processing system.

A basic adaptive steerable null antenna system is illustrated in FIG. 1. The radio transceiver 10 operates with a phased array antenna system which has a plurality of antenna elements, with two elements 12 and 22 shown. With a phased array, peaks or nulls of the antenna pattern may be set in a desired direction by adjusting the relative phase and amplitude of the radio frequency currents in the transmission paths between the antenna elements. If the phase and amplitude circuits are made adjustable, the pattern may be steered in a desired direction.

In FIG. 1 a steerable null antenna processor (SNAP) comprises adjustable phase shift circuits 14 and 24 for the respective antenna elements 12 and 22, respective adjustable amplitude circuits 16 and 26, a summer of signal combiner circuit 18, and a controller 28. The controller 28 may be operated either with manual controls, or automatically with a feedback signal. It supplies control signals to adjust the values of the circuits 14, 16, 24, and 26. This block diagram may be used to represent the system covered by U.S. Pat. No. 3,964,065, and also in a general way for the system disclosed herein. The combination of the adjustable phase and amplitude circuits may be referred to as vector multipliers.

Many modifications of the basic system are possible. There may be additional antenna elements. In general the maximum number of simultaneous interference sources that may be separately nulled is equal to the number of antenna elements less one. The elements may be directional in nature rather than omindirectional. Spacing of elements in the array may be varied from quarter-wave to many wavelengths. The most desirable spacing is noncritical, but spacing on the order of three-eights of a wave length provides for good performance characteristics for many applications. One of the antenna elements may be used as a reference and coupled directly to the combiner 18 or the phase shift and amplitudfe circuits for one antenna element may be fixed at an intermediate value, since it is the relative phase and amplitude that need to be varied to steer the nulls.

The adjustable amplitude devices in FIG. 1 may be variable attentuators of various types. However if the null is to be maintained during transmission, attenuators are inherently wasteful of power.

The preferred embodiment of the invention is represented by two designs, designated RTSNAP I for VHF operation, and RTSNAP II for UHF operation.

The first design, RTSNAP I, interfaces between two conventional center-fed vertical antennas and the RF input of transceivers for operation in the 30-MHz to 80-MHz frequency band. The second design, RTSNAP II, interfaces between four center-fed vertical antennas and the RF input of transceivers for operation in the 225-MHz to 400-MHz frequency band. Each RTSNAP design permits rapid manual and automatic nulling of the undesired signal or signals over a wide dynamic range in the receive mode while also permitting RF transmission at thelatest null setting achieved in the receive mode. The design includes a nulling meter for monitoring maximum nulling in the receive mode, together with an easily interpreted digital readout for monitoring the relative null azimuth over 360 degrees. The design includes critical components for phase shifting and attenuator networks that have reciprocal high-power-level receive-transmit capability, octave bandwidth, wide dynamic range, and capability of being controlled incrementallly by variable rapidly switching digital circuits. The RTSNAP design does not substantially degrade the near, far, and co-site performance of the receiver. Third order intermodulation and trnamit spurious products are kept to a minimum. The digital processor circuits vary phase and amplitude in specified increments consistent with achieving 35-dB nulls and minimal null acquisition time. Both RTSNAP I and RTSNAP II have similar receive, transmit, and nulling performance requirements, resulting in similar design analysis and techniques with only a translation in operating frequencies.

The basic technical approach taken to fulfill the RTSNAP requirements uses an adaptive array technique. With this technique, the composite pattern of an antenna array is adjusted to provide the best match to a signal environment containing both desired signals and unwanted interference sources. The composite antenna pattern is adjusted for optimum reception and transmission in the direction of the desired signal while placing null(s) in the pattern in the direction of interferer signal(s). An idealized two-element array system would have phase and amplitude control circuits that operate efficiently at a high level output in reciprocal receive and transmit modes.

When considering nulling capability in a RTSNAP receive mode and the ability to transmit this same best-found composite antenna pattern in the transmit mode, the same accuracy of phase and amplitude control must be exercised in either RTSNAP mode.

While nulling in the receive mode, construction variations in calibration of the phase shifting and amplitude control devices or in antenna element performance can be compensated for by an adjustment procedure. If the same circuits are used without change for transmission as well as for reception, the transmitted null pattern is identical to the received null pattern.

For the high power level two-antenna-element approach, the output of the transceiver is fed through a low loss variable-ratio power splitter. A four-antenna system is configured as a dual two-antenna system combined through another low loss, variable ratio power splitter. Received energy from each antenna element is processed by the phase and amplitude controls associated with each antenna element. In the receive mode where more than one signal is present at an antenna port, all signal vectors, desired and undesired, are rotated in phase and adjusted in amplitude by the same amount in that antenna element. Summing of these signal vectors processed by each antennal element's phase and amplitude controldevice results in a composite antenna array pattern. The shape of this pattern can be adjusted, with nulls positioned in the direction of undesired signals while retaiuning reasonable gain in the direction of desired signals. The signals are amplified and processed in a companion transceiver modem external to RTSNAP. In the transmit mode, an antenna pattern that is identical to the last receive-mode composite pattern adjustment is transmtited. This duplicate composite antenna pattern requirement implies phase and amplitude control devices with reciprocal transmission for stability. The companion receiver IF output is used to evaluate the pattern performance and provide the heuristic processor logic controlling each antenna element phase and amplitude control device with feedback signals on the relative improvement or degradation of the antenna pattern, for automatic mode of operation. The heuristic processor operates to select the most advantageous antenna pattern.

Octave bandwidth phase and magntidue control circuits for high-power-level signals limit the design technique approaches; however, components have been found that are within the state-of-the-art to meet thwe RTSNAP I and RTSNAP II requirements. By using PIN diode switched delay lines as phase shifting devices and a variable ratio power combiner as an amplitude control device, maximum transmit capability of 40 watts can be met or exceeded. Since these two devices are reciprocal to receive and transmit modes, the maximum receive mode energy is also 40 watts. With this design,the only distorting element in either the receive or transmit circuit paths are the PIN diode switches. The PIN diode acts as a resistor at RF frequencies in either its ON or OFF state, resulting in low intermodulation products. The PIN diode can be switched in just a few microseconds and will not offer any limitation to the automatic incremental adjustment or null acquisition time. The state-of-the-art of high power level PIN diode switching is well in excess of the 40 watts average RTSNAP requirement.

The RTSNAP system design includes provisions for separately monitoring null depth and null angle. Null depth monitoring over a 40-dB dynamic range is accomplished by monitoring the received signals from an output of the companion receiver IF amplifier. These IF signals are amplified by a logarithmic amplifier over the companion receiver's dynamic range, and may be monitored with the null depth meter. Monitoring the null angle representing the direction of undesired signals for RTSNAP I offers no serious design problems; however, in RTSNAP II where simultaneous multiple nulls can be obtained, ambiguity exists in determining the proper null.

The operator controls and digital controller are critical elements of the RTSNAP designs. The digital controller contains all control circuits necessary for correct system functioning and for interfacing between the companion receiver/modem S/I signal in automatic mode. The digital controller translates motion of the operator controls into effective digital commands in the manual mode. In the automatic mode, a heuristic digital controller duplicates an operator's decisions and manual control in improving the signal-to-interferer ratio in a faster and less tedious manner. This automatic mode will also result in a means of tracking moving interferers.

Digital designs are used that utilize up-down counters to control the phase shifter and attenuators. The granularity of the digitally controlled phase shifters and attenuators has been chosen such that the resultant desired signal can achieve a minimum of 35-dB advantage over the undesired signal. Use of digital control of the null positioning circuits of the RTSNAP readily adapts the system to manual, automatic, or remote operation.

The basic technical approach taken to fulfill the RTSNAP requirements uses an adaptive array technique. With this technique, the composite pattern of an antenna array is adjusted to provide the best match to a signal environment containing both desired signals and unwanted interference sources. The composite antenna pattern is adjusted for optimum reception and transmission in the direction of the desired signal while placing null(s) in the pattern in the direction of interferer signal(s).

Figure 2:
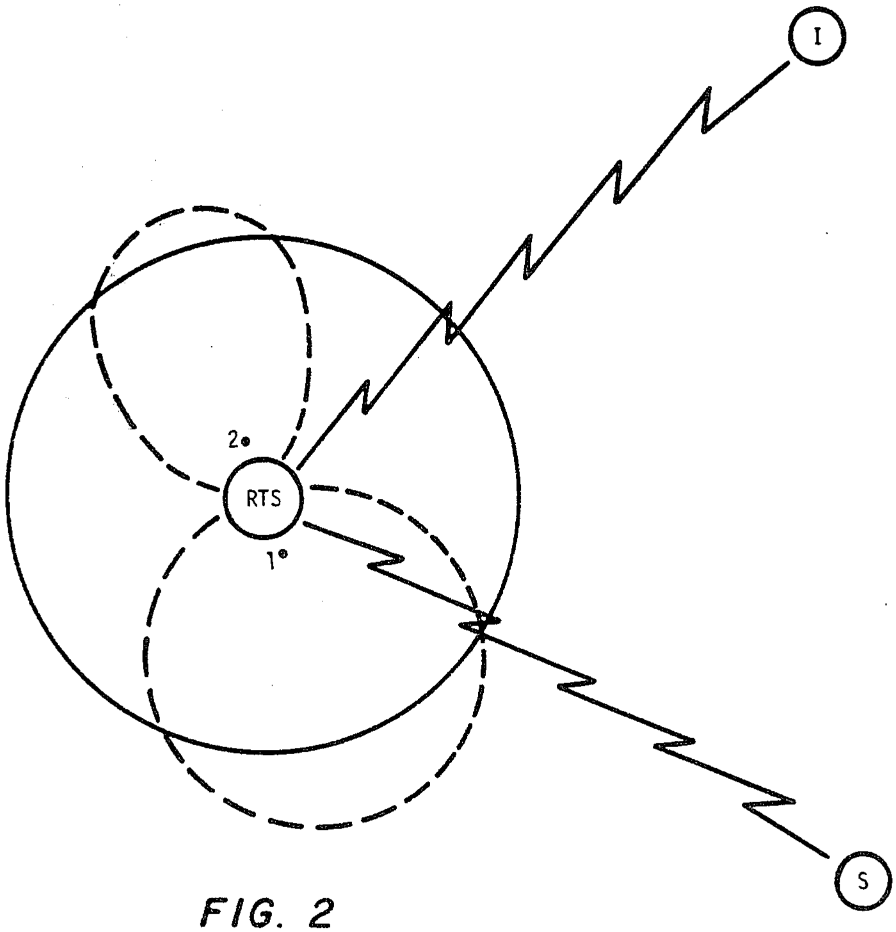
FIG. 2 is a diagram showing antenna patterns.

The adaptive antenna technique used in RTSNAP is best described through consideration of a simple, two-element, adaptive-antenna receive system. In FIG. 2, the large circle depicts the azimuthal plane radiation pattern that would be expected to result from a single element antenna. No preference is given to any direction of arrival, and if the signal-to-interference ratio is measured at the single element antenna output to provide an index of system performance (A), then $A=S/I$. If an additional antenna element is added and controllable vector multipliers are placed in series with each antenna output with systems performance then measured by using the sum of the two vector multiplier outputs, the dashed line array pattern is realized with proper vector multiplier adjustment. The system performance when using two elements is the $A_{(2)}=k(S/I)$, where k is the null depth referenced to the signal antenna element pattern. Null depths substantially in excess of 35-dB may be achieved by using this technique. The use of the two-element approach also provides a theoretical improvement of 3-dB in gain in directions remote from the null directions. If the vector multipliers are bilateral, then the same configuration may be used to provide identical transmit and receive patterns.

FIG. 3 is the vector representation of signals arriving at the antennas of the previous figure, from signal sources as indicated by the symbols (I) and (S) on that figure. From the diagrams, an example of the initial resultant vectors (sum of the signals from antennas 1 and 2) with an unnulled RTSNAP shows the signal from the interference source $I_R$ being greater than the signal from the desired sources $S_R$. By equally shifting the phase of both signals from antenna I and equally adjusting both signal amplitudes, it can be seen that the $I_1$ vector can be adjusted to cancel the $I_2$ vector, eliminating the interference signal. The $S_1$ vector, representing the rotated and attenuated $S_1$ signal, combines with the $S_2$ vector in the summing network, resulting in a weaker but useable signal $S_p$ from the desired source. The vector diagrams are idealized in that it is assumed that the I vector can be phase shifted and attenuated to exactly cancel the I vector. Even with complicated and expensive analog circuits, component and system tolerances as well as field condition variations result in drifts that will not permit exact cancellations, and a residue interference signal will exist. However, a very significant improvement in S/I is achieved.

A two-element array system has delay and amplitude control circuits which operate efficiently at a high level output in reciprocal receive and transmit modes with minimum insertion loss. It follows that a four-antenna system can be configured as a dual two-antenna system combined through another lossless, variable ratio power splitter. Received energy from each antenna element is processed by the delay and amplitude controls associated with each antenna element. In the receive mode where more than one signal is present at an antenna port, all signal vectors, desired and undesired, are delayed in time and adjusted in amplitude by the same amount at that antenna element. Summing of these signal vectors processed by each antenna element's delay and amplitude control device results in a composite antenna array pattern whose shape can be adjusted with pattern nulls positioned in the direction of undesired signals, while retaining reasonable gain in the direction of desired signals. The signals are amplified and processed in a companion transceiver modem external to RTSNAP. In the transmit mode, an identical antenna pattern is transmitted that is the last receive-mode composite pattern adjustment. This duplicate composite antenna pattern requirement implies delay and amplitude control devices with reciprocal transmission paths for stability. For automatic mode operation, the companion receiver IF output is used to evaluate the pattern performance and provide the heuristic processor logic controlling each antenna element delay and amplitude control device with feedback signals on the relative improvement or degradation of the antenna pattern. The heuristic processor forms the most advantageous antenna pattern.

Figure 6:
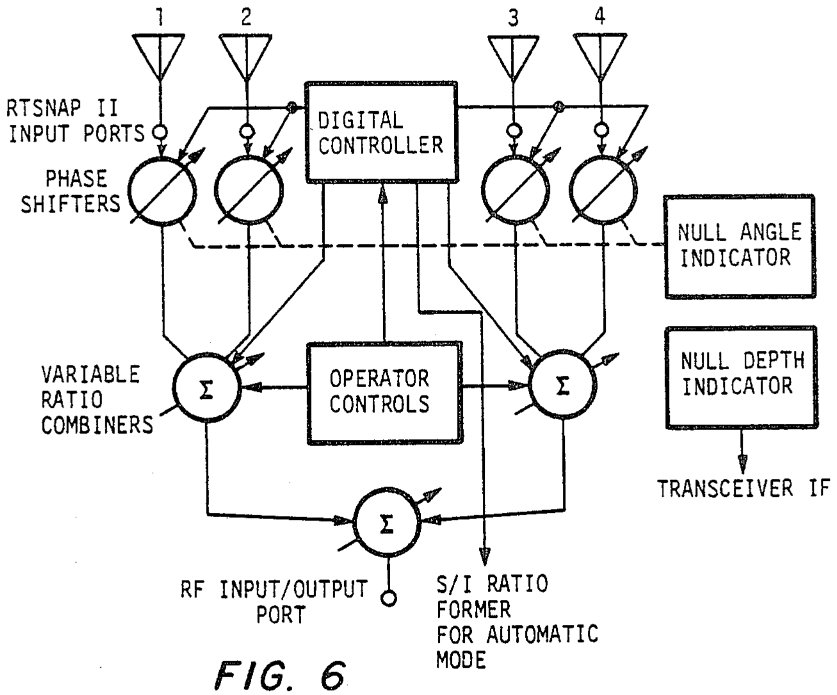
FIGS. 6–8 are block diagrams of a system RTSNAP II with four antenna elements.
Figure 7:
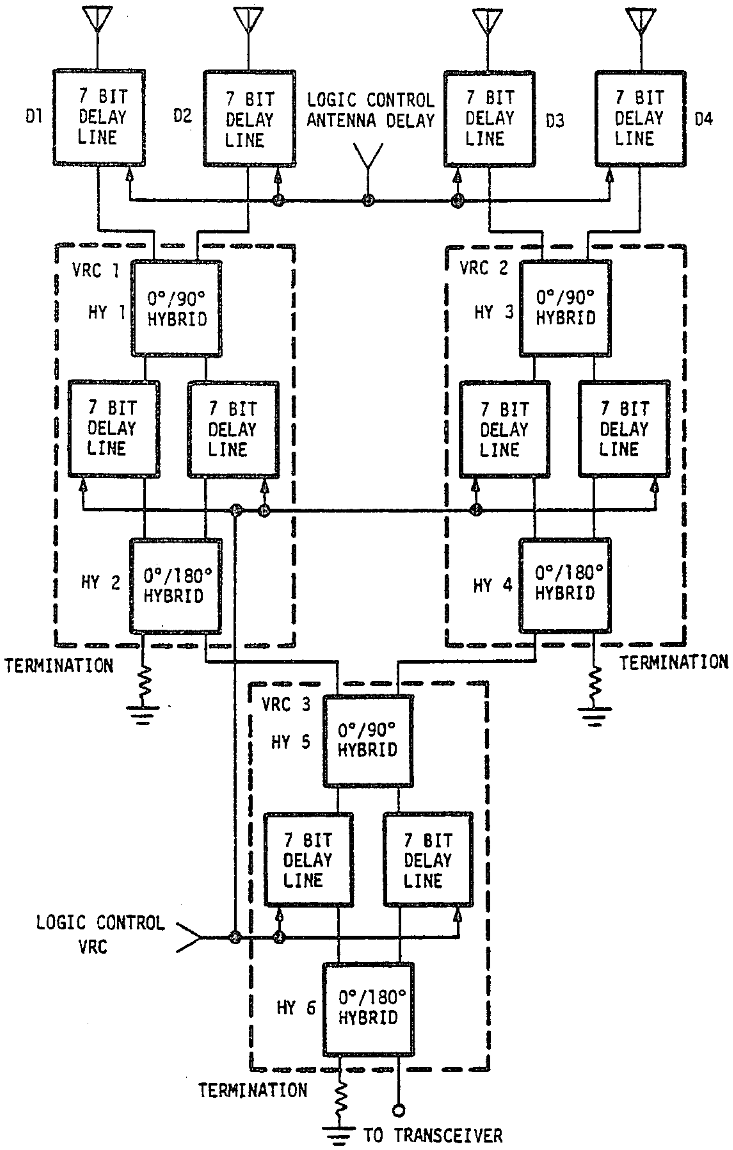
Figure 8:
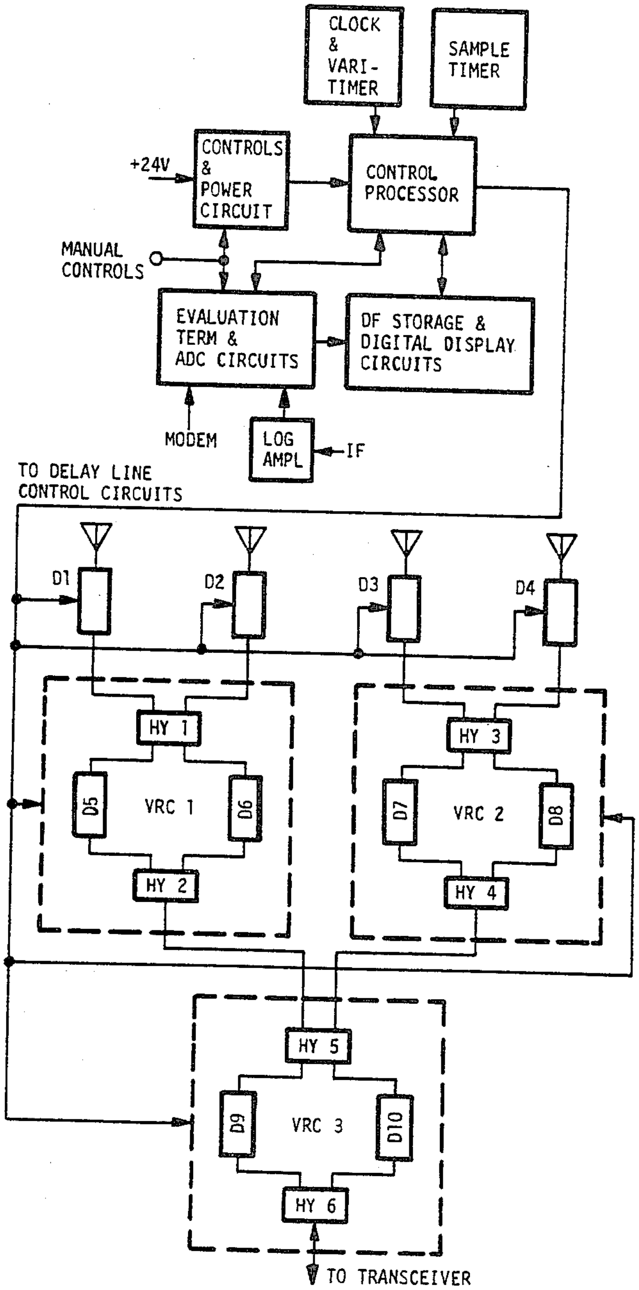

The general system design of RTSNAP I (FIGS. 4 and 5) and RTSNAP II (FIGS. 6–8) is very similar with respect to the basic RF circuit configuration and the logic control unit for the manual and automatic control modes. The RF circuit designs of RTSNAP I and RTSNAP II are very similar, consisting primarily of PIN diode switched delay lines, quadrature, and 0/180 degree hybrid junctions. The switched delay line connected as a binary seven-bit delay line phase shifter provides a means of varying the differential delay of the RF energy between antenna elements in ±128 incremental delay steps. Likewise, two similar binary seven-bit switched delay lines connected between the output ports of the quadrature and 0/180 degree hybrids in a variable ratio power combiner configuration provide a means of varying the ratio of the power between antenna elements. The RF circuit of RTSNAP I, the two-antenna-element unit, consists of a binary seven-bit switched delay line phase shifter in each antenna element, combined through a variable ratio power combiner VRPC to the tactical transceiver, FIGS. 4 and 5. RTSNAP II, the four-antenna-element unit, consists of two RTSNAP I RF circuit configurations connected to the four antenna inputs, with their outputs combined through another VRPC, and then on to the tactical transceiver as shown in FIGS. 6–8. Only the binary delay line lengths, stripline circuit dielectric material, and physical size are different in the RF circuits of RTSNAP I (30 to 80 MHz) compared to RTSNAP II (225 to 400 MHz). A binary seven-bit switched delay line is configured as a stripline module, with the delay lines eteched on printed circuit boards of controlled dielectric constant and sandwiched between two aluminum plates. These stripline modules of the seven-bit delay line are stacked in a row and used as either a phase shifter or amplitude control in a variable ratio combiner configuration. The RF circuits are kept separate from the logic drive circuits, thereby resulting in identical RF modules of the seven-bit delay lines.

In the following sections a detailed description of the RTSNAP I and RTSNAP II RF circuit design plan is presented, followed by a detailed description of the switched delay line and variable ratio power combiner VRPC, and then circuit descriptions of the RTSNAP I and II control and indicator circuits.

The RTSNAP I unit interfaces between two center-fed vertical antennas and the RF input of tactical transceivers, permitting rapid manual and automatic nulling of undesired signals over a wide dynamic range in both the receive and transmit modes for all signal azimuths. FIG. 4 illustrates the RTSNAP I system configuration of six major subsystems:

1 Antennas
2 Phase Shifters
3 Variable power dividers
4 Null angle indicator
5 Null depth indicator
6 Digital controller and operator controls.

The null combiner must have the capability of adjusting the power level and phase of an interfering signal in each antenna element to produce a cancellation of that signal's vectors after summing. This results in a null in the aximuthal direction of the undesired signal. For RTSNAP I, the radiation intensity from each antenna element must be equal in the desired direction of nulling or a deep null cannot be achieved. Thus, the element pattern (as measured within the array plane) is of importance, for if the element patterns orient at different angles, and the element pattern varies in gain by 5dB, then RTSNAP I must provide an internal power ratio capability to correct for this element directional power gain difference. Although antenna array design is not a part of the RTSNAP design plan, careful selection by the user is desirable to minimize the power losses due to mismatch to the RTSNAP unit during transmission.

The vector multiplier, which includes the delay line phase shifter and variable ratio combiner VRPC in this design, interfaces directly with the RTSNAP I antenna ports. This design offers reciprocal receive and transmit operation at a 40 watt level with high transmit efficiency and low insertion loss. The vector multiplier phase shifter consists of a binary seven-bit PIN diode switched delay line. Similar seven-bit delay lines are used as the control mechanism that adjusts the amplitude from the output ports of the VRPC in any desired ratio over a 30 dB range. Two seven-bit delay lines are used in the VRPC, and are varied in equal delay increments and opposite directions to produce a variable amplitude ratio with constant phase differential. The delay lines in the VRPC are driven simultaneously in 128 incremental steps. Also, the seven-bit delay lines for each antenna element are controlled by a common eitht stage up/down counter in 128 incremental delay steps, for a total differential delay adjustment capability of 256 incremental steps. The antenna elements' delay lines will initially be set for minimum delay, with the heuristic controller designated to optimize on a minimum differential delay setting between antenna elements to achieve a null using the shortest delay line segments possible. This avoids the longer delay bits that result in 180 degree phase shift when an octave bandwidth is exceeded.

The PIN diode SPDT solid state switches are used to switch the transmission delay line element bits in binary steps. The arrangement for switching control of the PIN diodes is disclosed in my copending application (Ser. No. 180,554, filed Aug. 25, 1980 for Switched Delay Line for Steerable Null Antenna System.

Figure 9:
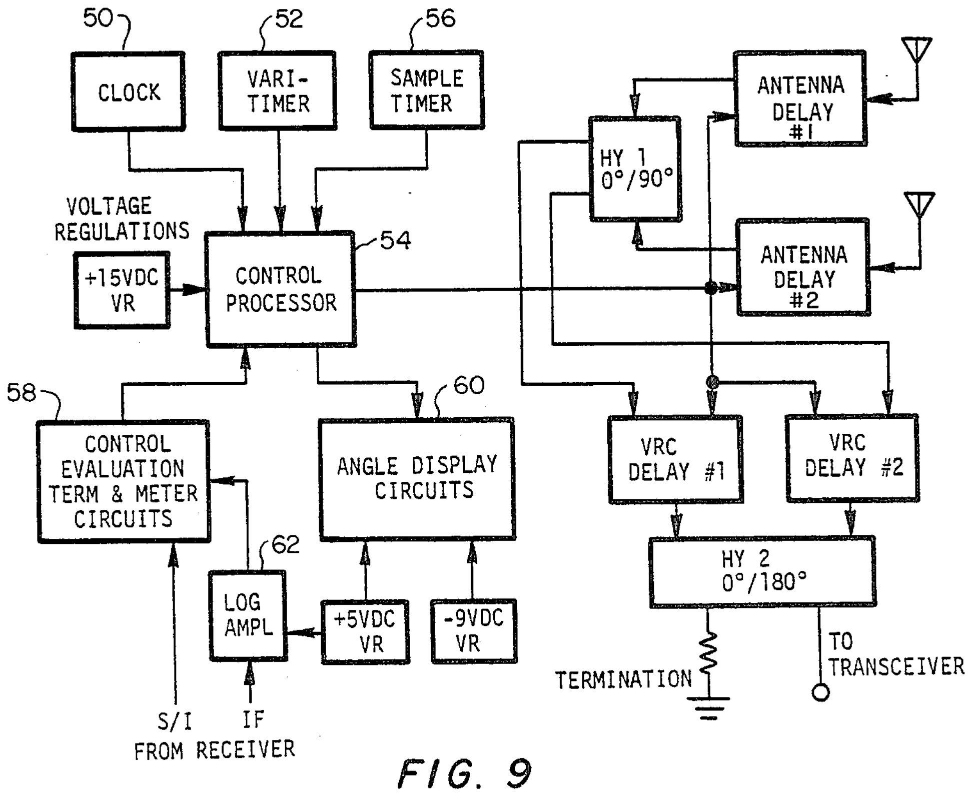
FIG. 9 is a RTSNAP functional block diagram.

A functional block diagram of RTSNAP II is shown in FIG. 9 to illustrate the control processor and its pertinent logic and control functions. High Beta transistor switches are used to drive the PIN diode switch bias network directly. Seven-stage up-down counters in the control processor drive the PIN diode switches' transistor drivers, to control the delay line in 128 incremental increasing or decreasing delay sets in each antenna element. Likewise, an amplitude control seven-stage up-down counter controls the two delay lines in the combiner VRPC in opposite delay directions and in equal 128 step incremental steps.

The system clock 50 provides the basic timing for the control logic circuits, which includes a manual mode sequencer and an automatic control mode sequencer. The varitimer circuits 52 are used only in the manual control mode. In manual mode, when the operator first presses the four way function control switch to either amplitude or delay, increasing or decreasing, the varitimer starts the basic clock timing pulses to the amplitude and pulse delay lines at a very slow rate. As the operator continually presses the function switch, the varitmer output clock rate increases to a fixed maximum rate compatible with operator reaction time. This allows the operator a variable rate of control, slow when in deep nulls to change one delay increment at a time, and fast when trying to achieve a rapid approximation of the null before final sensitive deep null adjustment.

The automatic mode control circuits are contained in the control processor 54, sample timer 56, and control evaluation term and meter circuits 58 as shown in FIG. 9. The operator simply switches a front panel mode selector switch to AUTO in a RTSNAP receive mode, and the unit will automatically null interference(s). An automatic sequencer steps through a logic sequence, changing first delay and then amplitude differential between the two antenna elements, in such a direction as to improve the received signal to interference (S/I) ratio. The S/I voltage term is derived in the companion receiver, and is applied to the RTSNAP as the evaluation term in the automatic control mode. This evaluation S/I term is then applied to a simple and hold circuit and compared against the last S/I sample for improvement or no improvement. The heuristic logic sequence in the automatic control mode continually searches, with delay and magnitude adjustments in each antenna element, for improvement in the received S/I ratio. An automatic power leveling mode is also included to automatically place a null in the direction of the strongest received signal source. This mode will be used when an interferer is known to be much stronger than the desired signal. An IF input (before limiting) from the companion receiver is amplified by a wide dynamic range log amplifier in the RTSNAP, to provide an evaluation term to the same sample and hold circuit that is used in the automatic nulling mode. In this case, the heuristic logic controls the phase and amplitude adjustment in the delay lines for maximum signal. The logarithmic amplifier 62 can provide over 100 dB dynamic range of the received signals for the front panel meter. A front panel meter scale adjustment provides a means of displaying 40 dB of signal range, out of the 100 dB dynamic range.

The RTSNAP transmit mode can function in the manual, power leveling, or automatic nulling control modes. The system timer is inhibited during the transmit mode, and the transmit array pattern will be that of the last pattern achieved in the receive mode.

RTSNAP I CONTROL AND MONITOR CIRCUITS

The RTSNAP I control and monitor functional block diagram is shown in FIG. 9. The basic circuit functions are:

1 Clock 50
2 Varitimer 52
3 Control Processor 54
4 Sample Timer 56
5 Control Evaluation Term and Meter Circuits 58
6 Angle Display Circuits 60

By front panel controls an operator can select three modes of RTSNAP control0 manual, power leveling, or automatic modem. The control processor and related logic circuits provide digital control to adjust the differential delay and amplitude of input signals between two antenna elements to achieve a null in the direction of an interferer. The system clock provides the basic time pulses for the manual and automatic logic functions and sequences. The varitimer is used in the manual mode only, and is a variable rate clock that varies as the operator presses the four way joystick, to control the rate of change of the delay line or combiner VRPC incremental control. The control processor contains the central control logic for either the manual or automatic mode. The sample timer 56 and evaluation term circuits 58 are used in the automatic modes. The controls circuit provides an interface between front panel manual and automatic controls and the central processor. The angle display circuits 60 convert the eight-bit digital output of the antenna delay counter to a three-digit LED display of null angle position, upon operator front panel command. A logarithmic video input provides the evaluation term of the meter and control circuits.

Figure 10:
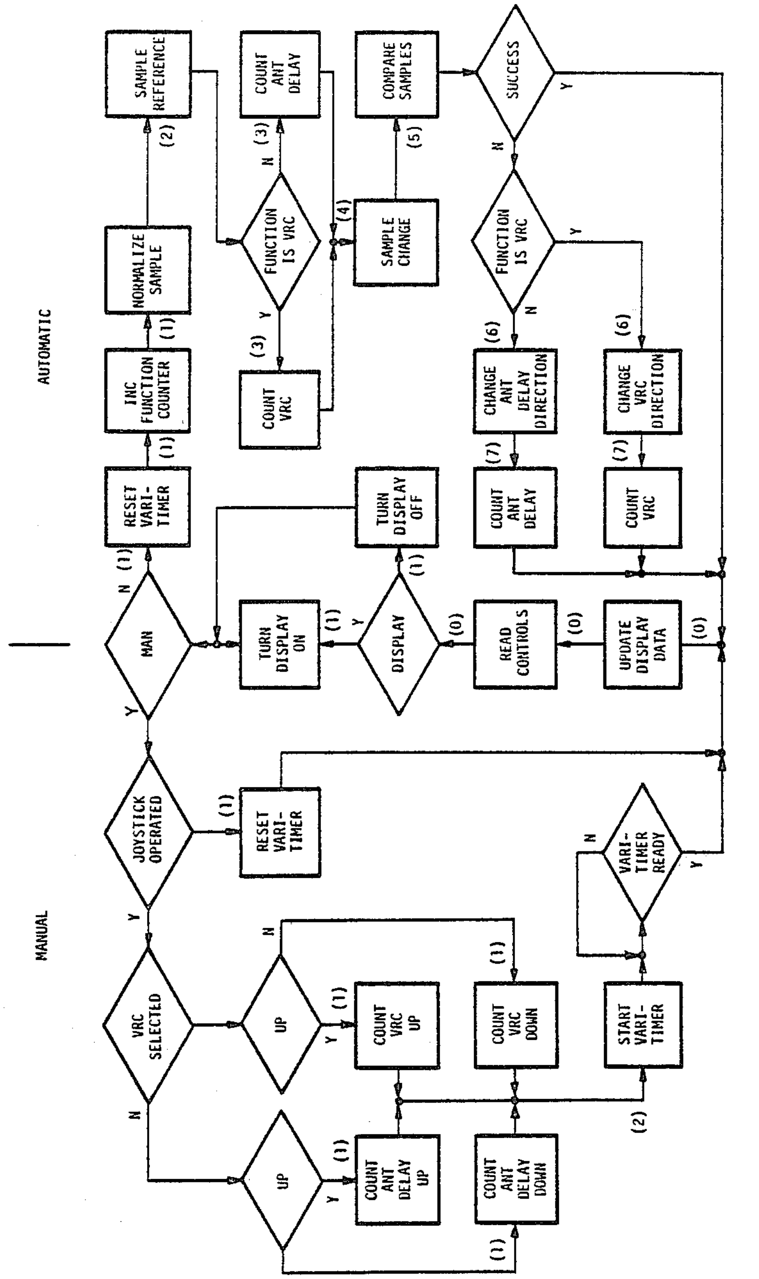
FIG. 10 is a RTSNAP I process flow diagram.

The simplified RTSNAP I process flow diagram illustrated in FIG. 10 contains the basic manual and automatic control functions necessary for achieving a null or power leveling of antenna input signals. Once the primary power has been turned on, the operator selects the mode of operation he desires. For manual control, he rotates the three-way rotary switch to MANUAL and presses the MODE SELECT pushbutton. The operator can then operate the joystick control in the following manner:

1 Amplitude (VRPC) increase—UP direction
2 Amplitude (VRPC) decrease—DOWN direction
3 Delay increase—LEFT direction
4 Delay decrease—RIGHT direction By positioning the four-way joystick, the operator selects VRPC control (amplitude) or delay line contrl (phase) in either increasing or decreasing increments. When the operator first presses the four-way control, the varitimer begins clocking the amplitude or delay incremental control bits at a slow rate. This controlling clock rate increases as he continues to press the four-way joystick in the same direction. If the operator should change direction or function, the varitimer starts again at its slow rate. This aids the operator in achieving a single binary bit change in amplitude or delay while in a deep null. The faster clock rate capability is to speed up initial acquisition of a null in the direction of an interferer. This manual cycle can be repeated until maximum null is obtained. The operator can display the interferer angle by pressing the DISPLAY BEARING pushbutton. The three digit LED display is continually updated to show the latest antenna delay line settings. The front panel display is strobed by a TURN ON command initiated by the front panel pushbutton control. This strobing of the LED display conserves power.

The operator selects the automatic control modes by positioning the three-way rotary switch to either POWER LEVELING or AUTOMATIC MODEM, and then pressing the MODE SELECT pushbutton. The selection of power leveling or automatic modem mode also selects the proper control evaluation term for automatic feedback control between the RTSNAP I and the transceiver. The varitimer is reset and not used in the automatic control modes. The system clock initiates the basic timing for the heuristic sequence control logic. On first entering the control loop, the function counter (delay or VRPC) is changed from its last function control. For example, when changing from delay control to VRPC control, the evaluation term for the new function control, VRPC, is sampled and held as a reference. Since the function is now VRPC, the next logic decision is to advance the VRPC control counter one increment and then sample the evaluation term again and compare it to the previous sample reference.

The differential increase or decrease of the evaluation term for this incremental change indicates the success or failure of improving the received S/I ratio or signal focus power leveling term. If successful, the display storage circuits are updated, the automatic loop is reentered, and the loop cycle repeated. The angle display can be activated by the operator at any time, to read the latest null angle delay line setting. If no success had been achieved in the initial assumed VRPC control automatic mode, the logic decision is then to change the VRPC direction and return to the initial VRPC reference setting. The automatic cycle reenters the start of the automatic loop and the function is changed to delay control. The automatic cycle then continues, constantly changing from delay to VRPC control, in increasing or decreasing directions, looking for improvement in the control evaluation term to improve the overall received signal S/I.

The system clock is part of two 2-input quad gates and is configured as a free-running multivibrator circuit whose output pulse rate is determined by two resistors and a capacitor. The system clock is inhibited during the RTSNAP I transmit mode, thereby inhibiting all manual or automatic logic controls. The system clock provides the basic timing for all manual and automatic sequences. The varitimer circuit supplies the VRPC and delay clock signals in the manual mode. The rate at which the clock varies is determined by a variable rate counter/divider circuit. The varitimer reset and start-continue pulses from the control processor are derived from initial turn on reset, the four-way joystick, and automatic mode operation as illustrated in the logic flow diagram, FIG. 10. Since an operator may decide to go from automatic cycle, the varitimer reset is required to initialize the timer for manual control.

The controls, evaluation term, and meter circuits provide the means for the interface between the operator, the companion receiver and the RTSNAP. The primary power ON-OFF switch applies +24 Vdc to three voltage regulators. The voltage regulators are three-terminal devices in a TO-3 case, requiring no high curtent pass transistor. A rotary switch selects the mode of control, which is not activated until the MODE SELECT pushbutton is pressed. In manual mode the Mode Select signal gates the four-way joystick control functions (delay or RCR, increasing or decreasing through a gate and also the selected control mode through a similar clocked gate. The selected mode of operation then gates a COSMOS analog switch to select the proper evaluation term analog voltage from either the S/I input from the companion receiver or the log IF input from the logarithmic amplifier 62. The Display Bearing command from a pushbutton is also gated through a clocked gate. The Mode Select signal is generated by a timing sequencer in the central control processor, and is called the Read Controls pulse. An operational amplifier in noninverting configuration acts as a buffer between the analog gate circuit and the evaluation term sample and hold circuits in the sample timer circuits and the log metering circuits. The meter display's 40 dB scale range is determined by the gain of an operational amplifier and its feedback resistors. This 40 dB full scale deflection can be adjusted over the total received signal dynamic range by a front panel control. With initial primary power the circuits generate an initial reset pulse to reset all counters.

The central control processor routes the manual or automatic control commands to control the VRPC and antenna delay Seven-bit delay lines DL1–DL4 in incremental binary steps in the proper timing sequence and direction. Input manual and joystick operated signal functions from the controls circuits initiate the Varitimer Start, Reset, and Continue Logic signals. A sequencer clocked by the system clock, controls the sequence of the read controls to the control circuits, varitimer resets, normalized sample and store circuits.

The binary counter and drive circuits for the antenna delay lines DL1 and DL2 and the VRPC variable ratio power combiner are part of the control processor logic. See my patent application Ser. No. 180,554 filed Aug. 25, 1980 for the description of a typical binary switched delay line, which is incorporated by reference.

The delay line input control signals come from the antenna delay select gate and consist of an initial reset, count clock, up, down and change/control an eight-stage up-down counter that provides a binary seven-bit code to drive both antenna's seven-bit delay lines DL1 and DL2 and a parallel eight-bit code to the angle indicator circuit 60. The eight-stage binary up-down counter controls the two antenna delay lines in a differential fashion. For instance, delay line DL1 is controlled over 128 incremental steps while delay lines DL2 is fixed at its minimum delay setting. Likewise, while delay line DL2 is controlled over 128 incremental delay steps delay line DL1 is set to its minimum delay setting for a total differential delay of 256 incremental steps and the required eight-bit code for antenna angle position. The AND-OR select gates select delay line DL1 or delay line DL2 for control. The seven-bit output from the AND-OR select gates is inverted to provide a complimentary input to the transistor drive circuits. The two antenna delay lines are always driven to minimize the differential delay between the two antenna elements, using the minimum length delay bits to avoid the longer delays for over octave bandwidth operation.

The circuit operation of the VRPC's two delay line controlling elements DL3 and DL4 is very similar to the antenna delay line. The VRPC seven-bit RF strip-line PIN diode switched delay lines are identical to the antenna delay lines, along with the differential transistor push-pull drive circuit and constant current source. The two seven-bit delay lines required for VRPC control, however, are driven in equal and opposite 128 incremental steps, to keep the output differential phase constant between the two VRPC antenna output ports. The input control lines to the VRPC counter and drive circuit are Initial Reset, Clock, Up, Down, and Change of Direction from the control processor AND-OR select gate. These input lines control the VRPC eight-stage binary up-down presettable counter which provides a seven-bit output to drive both seven-bit delay lines. The seven-bit output from the up-down counter is inverted to provide a complimentary seven-bit control to the differential transistor PIN diode switch drivers. The SPDT PIN diode switch operation is similar to that described in the antenna delay line. The eight-stage up-down counter circuit consists of recycle logic to limit the count to the required seven-stages, and also a limit count detection circuit to cause a halt or reversal in counter direction if it reaches its limit of all zeros or all ones. The VRPC control delay line DL4 is driven directly from the complement of the VRPC delay line DL3 seven-bit control.

The function of the sample timer circuits 56 is to sample the evaluation term, which is a measure of the received S/I ratio, compare it against the last reference sample, measure the differential sample change, and determine the direction of change for improvement or no improvement of S/I. The heuristic logic flow as described in FIG. 10 then maximizes the S/I evaluation term. As shown in step (1) of the automatic control loop of FIG. 10, a normalized sample pulse first normalizes the voltage across two capacitors by shorting them together through an analog gate. Then a new sample of the evaluation term charges one storage capacitor as the reference sample. The function being controlled, VRPC or antenna delay, is then stepped one increment and the analog evaluation term representing this new received signal charges the other capacitor through an analog gate. The sample change is compared with a comparator amplifier to determine if the incremental change resulted in improvement or not of the received S/I ratio. The system clock and sample sequencer from the control processor provide the basic timing for the compare circuits. These circuits function in the automatic mode only.

The angle indicator control circuit 60 continually read the latest antenna delay line eight-stage counter output, which represents the null angle, and converts the digital output to a decimal three-digit LED readout upon operator command.

Figure 11:
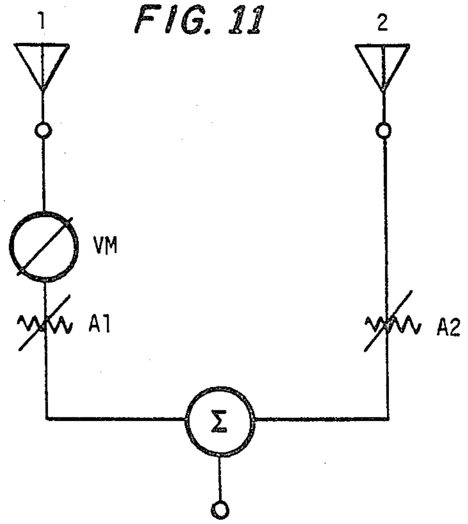
FIGS. 11 and 12 are diagrams to illustrate null angle identification in RTSNAP I.
Figure 12:
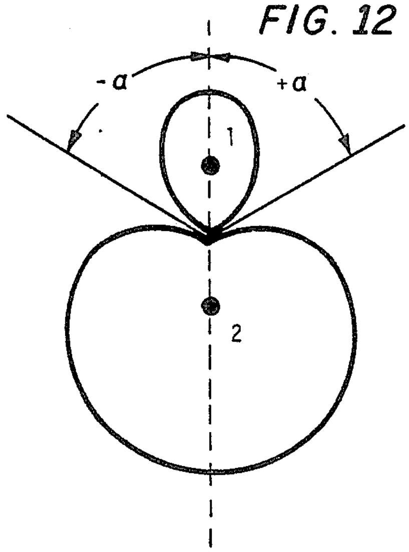

Since RTSNAP I uses delay instead of phase shift, no respacing of the antenna elements is required as a function of frequency. However, the elements must be sufficiently closely spaced (not more than $\lambda/2$) at the highest frequency to avoid unwanted additional pattern nulls. Digital read-only memories can be programmed to organize the antenna element delay counter in incremental delay steps, and angle indication of 180 degree in 256 incremental steps, to the digital angle indicator display. The approach is shown in simplified form in FIG. 11 for the two-antenna-element case. The transmit and receive antenna patterns are identical and are symmetrical about the line passing through the phase centers of the two antenna elements. Thus, a null produced on one side of the line has a mirror image of the other side, and as the first null is varied in position, the second null also varies. If the line through the elements is made the null angle reference, and the null along the line directed out from element 1 is taken as the 0 degree reference, then the angles of both nulls can be identified by one indicator because of the symmetry involved. Thus 0 degrees specifies a null (only one will exist because of the convergence) directed out the number 1 element end of the array (end fire), 90 degrees specifies two nulls that are broadside, and 180 degrees specifies a single null out the number 2 element end of the array. The general scheme is shown in FIG. 12. Since no information is available as to which null the interference is in (without introducing additional complexity), no determination is made as to whether the jammer is at $+\alpha$ or $-\alpha$. For each null angle 2, only one phase setting of the vector multiplier exists if the above spacing of antennas 1 and 2 is less than $\lambda/2$.

The angle indicator display circuits 60 receives the eight-bit word representing the null angle position from the antenna delay line eight-stage up-down counter. This parallel eight-line input is clocked into the read only memory by an Update pulse from the control processor timing sequencer. The read only memory has been preprogrammed to read out an eight-digit word representing angles of +180 degree in 256 incremental steps. The read only memory is a 256 word by eight-bit electronically programmable memory with a required supply voltage of +5 and −9 Vdc. The resulting eight-bit word output from the ROM is also gated through a clock latch by the Update pulse. The Update pulse strobes the ROM and its output latch to store the last phase angle setting, to conserve power by using the ROM only when needed. The latch storage gate is COSMOS and consumes very little power. The eight-bit output from the gated latch is then applied to the jam inputs of an eight-stage up-down counter. The counter is always forced to count down. When the operator presses the front panel BEARING DISPLAY a display inhibit pulse is removed from a display sequencer seven-stage counter. The display sequencer begins counting with the clock once the inhibit has been removed, and sets a gate to prepare for the sequential readout of the null angle setting. After a count of four, a Carry Out pulse from the seven-stage display sequencer jams the eight input lines from the ROM's storage latch into an eight-stage parallel-to-series counter. The seven-stage display sequencer will pause until the eight-stage binary-to-series counter counts down to all zeros from its preset jam input representing the angle. A carry-out pulse from the eight-stage parallel-to-series counter steps the seven-stage display sequencer one count and then counter recycles to its maximum count and counts down again to all zeros. As the eight-stage parallel-to-series counter counts down to zero, the clock also counts the three cascade binary-to-decimal counters up by the same amount, until the Carry Out pulse occurs at all zeros, and then inhibits the binary-to-decimal decoder from further counting. For the next three recycles of the eight-stage parallel-to-series counter the seven-stage display sequencer is advanced three times to strobe the binary-to-decimal decoder first in units, then tens, then in hundreds of degrees. This strobing conserves power consumed by the LED display, and it is at a fast enough rate that the display appears to be continuous. An updated angle indication will be displayed as long as the operator presses the BEARING DISPLAY front panel pushbutton.

RTSNAP II

The RTSNAP II unit interfaces between four center-fed vertical antennas and the RF input of tactical transceivers. It permits rapid manual and automatic nulling of undesired signals over a wide dynamic range, in both the received and transmit modes, for all signal azimuths. FIGS. 6–8 illustrate the RTSNAP II system configuration. From this illustration it can be seen that the RTSNAP II RF circuit configuration consists of two RTSNAP I circuits combined through a common variable ratio power combiner (VRPC), with the delay line bit lengths and hybrid couplers scaled to the higher 225 to 400 MHz frequency range. Similar to RTSNAP I, six major subsystems make up the overall system:

1 Antennas
2 Delay line phase shifters
3 Variable power dividers
4 Null angle indicator
5 Null depth indicator
6 Digital controller and operator controls.

The RTSNAP II interfaces with the external environment through a four-element array. The four-port null combiner has the capability of adjusting the power level and phase of each antenna element to point a null in the azimuthal direction of one or more simultaneous undesired signal interferers.

The vector multiplier, which includes the antenna delay line phase shifter and VRPC, interfaces directly with the four RTSNAP II antenna ports. Each antenna element vector multiplier offers reciprocal receive-transmit operation at a 40-watt level, with low insertion loss. The antenna phase shifter switched delay line and VRPC is similar in design to RTSNAP I, with the binary delay elements scaled to shorter lengths and the hybrid combiners of the VRPC changed to accommodate the increased operating frequency. The same antenna switched delay line RF design is also used as the amplitude control device in the VRPC. The two switched delay lines in each VRPC are varied in equal and opposite increments to produce a variable amplitude with constant phase differential output characteristic. The output differential amplitude can be varied over a range greater than 30 dB. PIN diode SPDT solid-state switches are used to switch the transmission line delay elements in a seven-bit binary ladder. The seven-bit delay lines in each of the four antenna elements and the two VRPCs are identical, and are constructed using stripline techniques. It is desirable to construct the ten seven-bit delay lines in a RTSNAP II system as identical modules, in order to simplify construction and testing procedures. The RF system component configuration is therefore very simple, being composed of combinations of seven-bit delay lines and hybrid junctions. The seven-bit delay lines in RTSNAP II function similarly to those in RTSNAP I, with each phase shifter delay line controlled by a seven-stage up-down phase counter in 128 incremental steps, for a total differential delay adjustment capability of 256 incremental steps between any two antenna elements. The two delay lines in each variable ratio combiner are driven simultaneously in 128 incremental equal and opposite steps. The seven-bit delay line bit elements vary from $\lambda/4$ to $\lambda/256$ in a binary fashion, and their physical lengths are cut for the RTSNAP II geometric mean frequency of 300 MHz, for a dielectric material constant of 2.54. The PIN diode has typical turn on and off times of 200 nanoseconds.

FIG. 8 illustrates the RTSNAP II control processor and its peripheral logic control and monitoring functions. COSMOS logic elements are used throughout, except for the high current drive circuits, to conserve power. Three regulated supply voltages are required: +15 Vdc, +5 Vdc, and −9 Vdc. A 9 volt dc to dc converter is used, requiring only single +25 Vdc primary supply to the RTSNAP II modem.

A completely digital design approach is used, using a sample and hold circuit to sample the evaluation term, and an analog-to-digital converter (ADC) to convert this sample of the received signal level to a 12-bit binary word. Successive samples are compared digitally by a heuristic process as a measure of improvement in the received signal environment, and as a means of controlling the antenna array pattern nulls to continue the search for constant improvement. Since the seven-bit delay lines can be directly driven by logic signals, no digital-to-analog converters are required. High beta transistor switches are used to drive the DPDT PIN diode switch bias network directly, similar to RTSNAP I. As in RTSNAP I, the two delay lines in each VRPC are driven differentially in equal and opposite delay steps. The three VRPCs are controlled as separate amplitude control devices, to proportion each antenna element's receive or transmit power to the proper level. Seven-stage up/down counters mounted on one of the delay line stripline module pairs drive the PIN diode switches' transistor drivers, to control the delay line in 128 increasing or decreasing incremental delay steps in each antenna element. An amplitude control seven-stage up/down counter will likewise control the two delay lines in each VRPC in opposite delay directions and in 128 equal delay step increments.

The system clock, which includes a common manual and automatic control sequencer, provides the basic timing for the control logic circuits. The varitimer circuit is used in the manual and DF control modes. In the manual mode, when the operator first presses the four-way function control joystick to either Amplitude or Delay, Increasing or Decreasing, the varitimer reduces the basic clock timing pulses to the VRPC and antenna delay lines to a very slow rate. As the operator continues to press the function switch, the varitimer output clock rate increases. This allows the operator a variable rate of control, slow when in deep nulls to change one delay increment at a time, and fast when trying to achieve a rapid approximation of the null before final sensitive deep null adjustment.

The operator can select four RTSNAP II control modes; manual, auto modem, auto power leveling (PL), or direction finding (DF). The operator simply switches the front panel Mode Select switch to MODEM or PL in a RTSNAP receive mode, and the unit will automatically null interferer(s). An automatic sequencer steps through a logic sequence changing first delay, then amplitude differential between antenna element pairs and their respective VRPCs in such a direction as to improve the received signal-to-interference (S/I) ratio. The S/I analog voltage term is derived in the companion receiver, and is applied to the RTSNAP II as the evaluation term in the automatic modem control mode. The evaluation S/I term is then applied to a sample-and-hold circuit whose sampled level is converted to a 12 bit digital word by an analog-to-digital converter.

Successive digital samples are compared digitally to derive a digital difference term that indicated improvement or not over the last sample of the received signal environment. Control logic is designated to optimize this term for constant improvement. The 12 bit binary word representing the sample of the received level is also applied to the amplitude display circuit and converted to the decimal equivalent of the received energy level in dB, over the total dynamic range of input received energy. This amplitude display circuit is actuated by a front panel DISPLAY switch, and can be used to indicate the optimization term performance in any of the four RTSNAP II control modes.

An automatic power leveling mode is included to automatically null the largest receive signals. An IF input (before limiting) from the companion receiver is required to derive the evaluation term for the PL control mode. This IF voltage is amplified by a wide dynamic range logarithmic amplifier in the RTSNAP II to provide an analog video evaluation term to the same sample and hold and ADC circuit used in the automatic modem nullin mode. The logarithmic amplifier can provide over 100 dB amplitude meter amplitude meter adjust as required.

In the manual control mode the operator controls the amplitude and delay of each antenna element by means of a four-way function control joystick switch and an Antenna Advance pushbutton. By means of the receiver aural output and observation of the front panel null amplitude LED display, the operator adjusts the four-way function switch and Antenna Advance until the interferer signals are nulled.

To determine an interferer's location, the RTSNAP II is switched to the DF mode. In this mode a fixed cardioid antenna pattern is generated and rotated in phase through 360 degrees by the operator's left-right motion of the four-way joystick, to position the cardioid null in the direction of the interferer(s). The null angle indication can be stepped in 2 degree increments to each interferer in succession. The operator can use aural detection means and the RTSNAP II amplitude display to determine the interference null. Null angle is displayed continuously in the DF mode to 360 degrees. When leaving the DF mode the null pattern is reestablished.

The RTSNAP II transmit mode can function in any control mode. The system sequencer is inhibited during the transmit mode with the transmit antenna array pattern being that of the last pattern achieved in the receive mode.

The power supplied to the RTSNAP II unit is +25 Vdc vehicular battery supply. The RTSNAP logic, analog, and RF circuits +15 Vdc, +5 Vdc and −9 Vdc regulated voltages. The −9 Vdc is derived from a dc to dc converter to simplify primary battery power requirements. The COSMOS logic works from +15 Vdc, while the special memory circuit logic in the angle and amplitude indicator circuits require +5 Vdc and −9 Vdc. The logarithmic amplifier hybrid modules ar also supplied by the regulated +5 Vdc bus.

The RTSNAP II control and monitor functional block diagram is shown in FIG. 8. The basic circuit functions are:

1 Clock and varitimer
2 Control processor
3 Sample timer
4 controls and power circuits
5 Evaluation term and ADC circuits
6 DF storage and digital display circuits.

By use of the front panel controls, an operator can select four modes of RTSNAP II control: manual, power leveling (PL), auto modem, and direction finding (DF). The control processor and related logic circuits provide digital control to adjust the differential delay and amplitude of input signals between four antennal elements to achieve a null in the direction of one or more interferers. The system clock provides basic time pulses for the manual and automatic logic sequences. The varitimer is used only in the manual and DF control modes, and is a variable rate clock that varies, as the operator presses the four-way joystick, to control the rate of change of the delay line or VRPC incremental control. The control processor contains the basic central logic for the manual, automatic, and DF control modes. The sample timer provides the sample pulses for the evaluation term sample and hold circuit prior to analog-to-digital conversion. It also contains the binary comparator that determines the relative improvement of successive evaluation term samples. The evaluation term and ADC circuit contain a select gate for either of two evaluation terms from the companion receiver; and S/I correlation term, or a log video input from the RTSNAP logarithmic IF amplifier. The analog evaluation term is then applied to a sample and hold circuit whose analog sample is converted to a 12 bit binary word by an ADC. The DF storage circuits contain the antenna delay line and VRPC memories to generate a fixed cardioid antenna pattern in the DF mode. Two identical digital display circuits convert the amplitude 12 bit binary word to a four digit LED decimal readout, and the null angle eight bit binary word to a three digit LED decimal readout. The controls and power circuits provide an interface between the front panel manual and automatic controls and the central processor.

Figure 13:
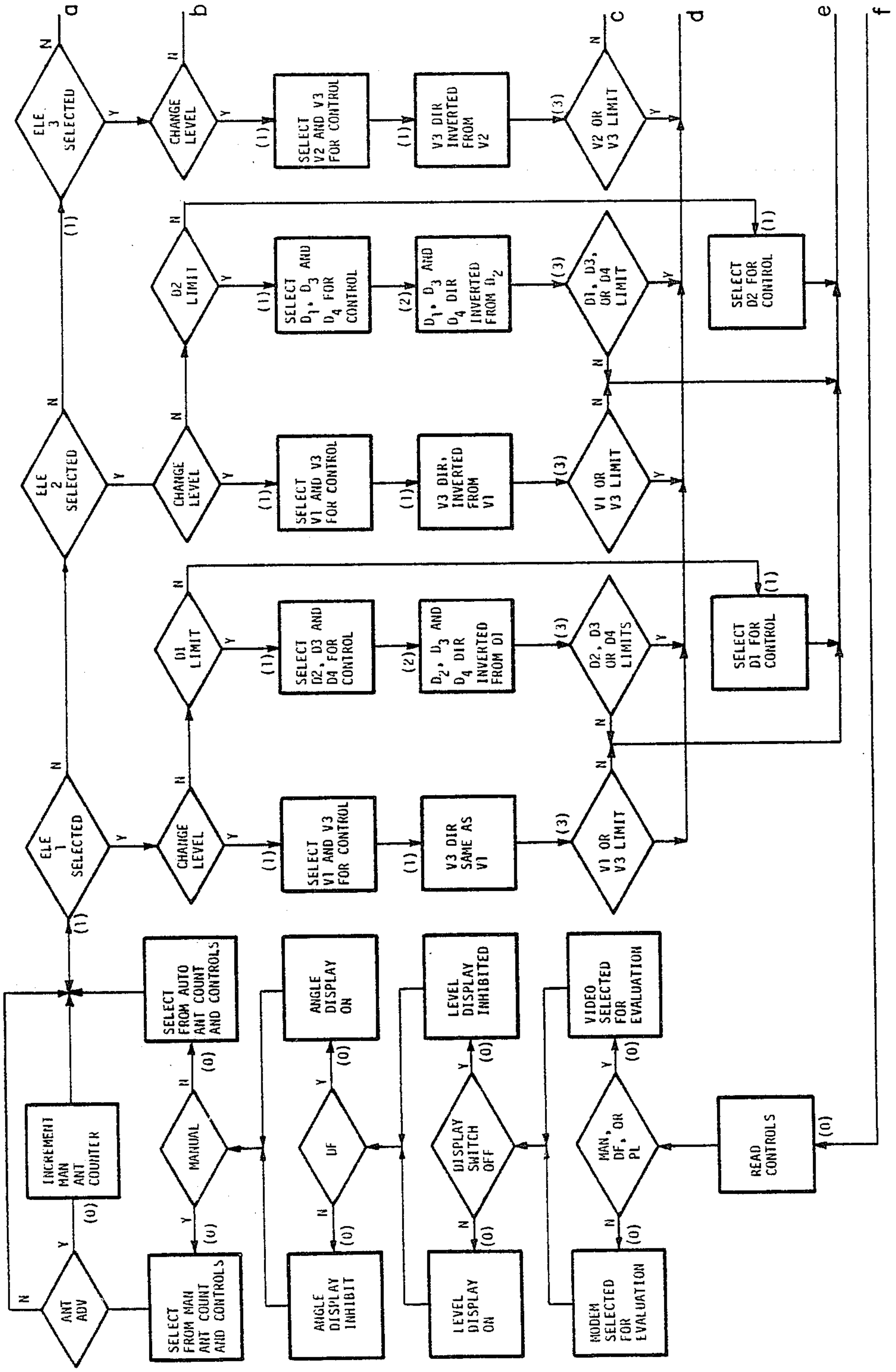
FIGS. 13 and 13A comprise a RTSNAP II process flow diagram.
Figure 13A:
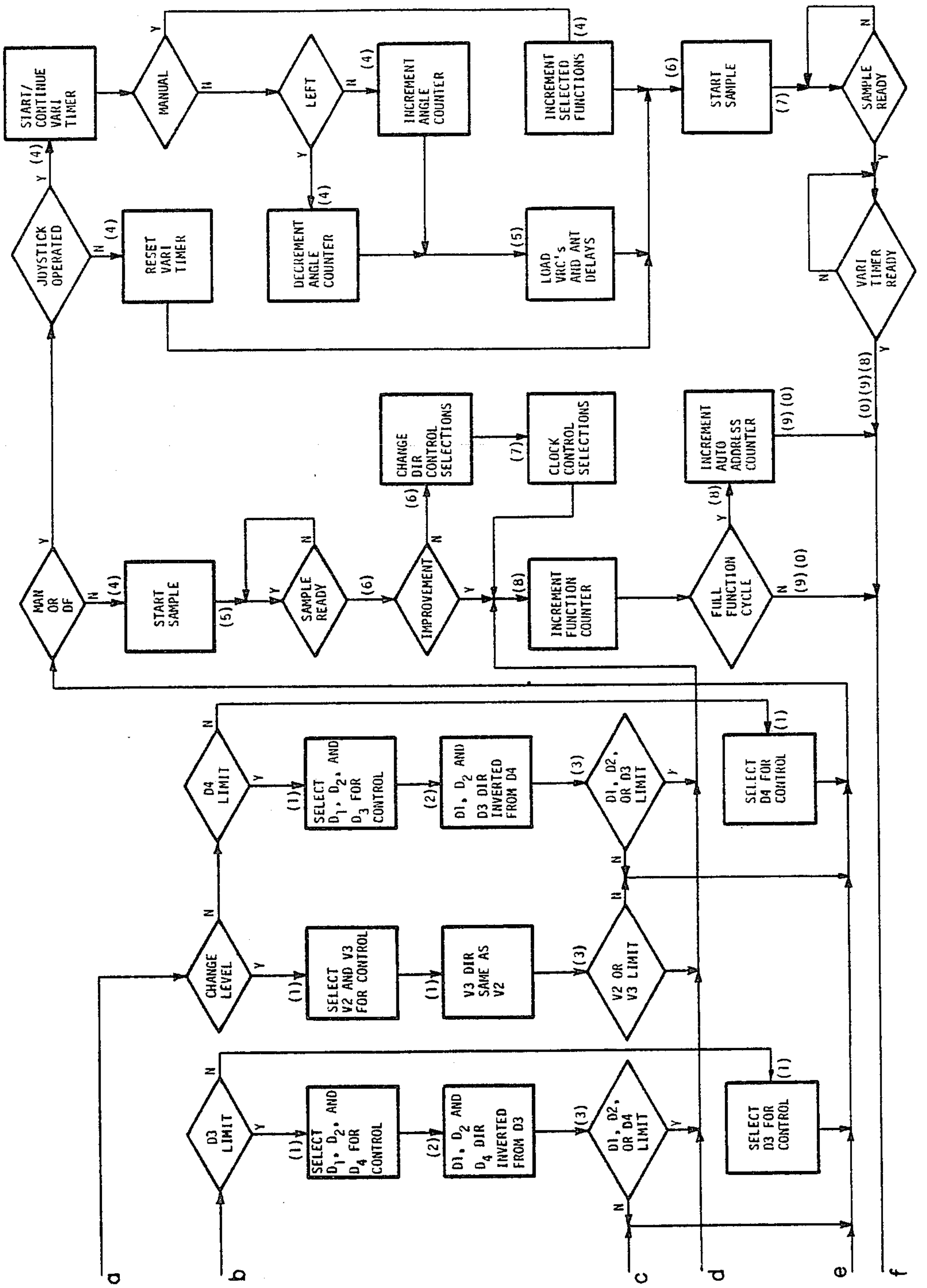

FIGS. 13 and 13A (hereinafter referred to as FIG. 13) illustrate the basic control functions necessary to achieve signal nulling, power leveling, or locating the direction of an interferer. The logic events are numbered time sequentially on the process flow diagram. With initial power turn on, the Read Controls at time T=(0) reset all timing logic and sequencers to an initial state. The operator rotates the Mode Select four way rotary switch to the mode of operation he desires. The Read Control logic selects the proper evaluation term for the chosen mode of operation: S/I for modem, or video for manual, PC, or DF. The Read Control Logic also controls operation of the amplitude and DF angle display, the manual or automatic control, and the antenna advance. The logic positions of these controls are determined by the selected mode. At time T(1), for any of the four selected control modes, if antenna element 1 is not selected, the logic skips to element 2, and so on. The process is identical for all elements. Element 1 selection is assumed for explanation. If the function is VRPC control, the level is prepared for change. Then VRC1 and VRC3, FIG. 8, are changed equally and in the same direction. If VRC1 and VRC3 are in limit at T3, the logic sequence steps to T8, where the function is changed to delay line control. When not in limit, manual, DF, or automatic modes are determined. If in automatic, modem, or power leveling, at T(4) the evaluation term is sampled by the sample and hold circuit, and stored as a reference sample after analog-to-digital conversion to a 12 bit binary word. Back at time T(1), if the function had been delay line control, delay line D1 would be checked for a limit. If no limit, then D1 is selected for control and the process loop continues to the manual, DF, or automatic control check similar to the VRPC loop above. With delay line D1 in limit, delay lines D2, D3, and D4 can all be controlled in the opposite delay direction to D1 for the same results. All three delay lines must be checked for a limit also at T(3). If any one is in limit, the process flow continues to T(8) to change function to VRPC control.

Once the proper element controls have been selected, with no limit problem, manual, or DF mode is determined at T(4). If in manual or DF, joystick operation is checked and if not in use, the varitimer is reset and the process flow continues to T(6) where a sample and hold is performed, and the evaluation term is then converted to a 12 bit binary word representing received input level at T(7) by the ADC. The varitimer acts as a delay before the process flow reenters the initial control loop at T(0) again. If the joystick is in operation at T(4), the varitimer is started and continues as long as the operator presses the four-way joystick. A test for manual control or DF is then made. If in manual, the function selected (delay or VRPC) is incremented; at T(6) the evaluation term is sampled; at T(7) converted by the ADC to a bit binary word; and control reenters the process loop again after the varitimer times out. If the control mode has been DF, the joystick direction is determined, left for decreasing angle and right for increasing angle. The antenna delay line and VRPC memories in the angle display circuit are loaded at T(5) to select the preprogrammed delay line settings needed to form the cardioid antenna array pattern with a null at the selected angle. The evaluation terms (video) is then sampled at T6; converted to digital at T(7) for the amplitude display circuits representing the received signal level; and control again reenters the initial process flow at T(0).

Retrace the process flow back to T(3) with the function (delay or VRPC) not in limit, with the control mode selected as automatic modem or power leveling. During T(4), samples of the two successive evaluation terms are then made by the sample timer and converted to a 12 bit binary word representing their levels. The numerical difference of the samples is formed to determine improvement or not at T(6). If no improvement occurs, the direction of the controlled function is changed. If there was improvement, the success loops and function sequence can be varied to provide a number of alternative heuristics. This is accomplished internal to the RTSNAP by a variable jumper tap. If the cycle is complete for the function under control, and both functions have been tried in the antenna element under control, the antenna address counter increments to the next antenna element before returning to the initial T(0) process flow reentry.

Figure 14:
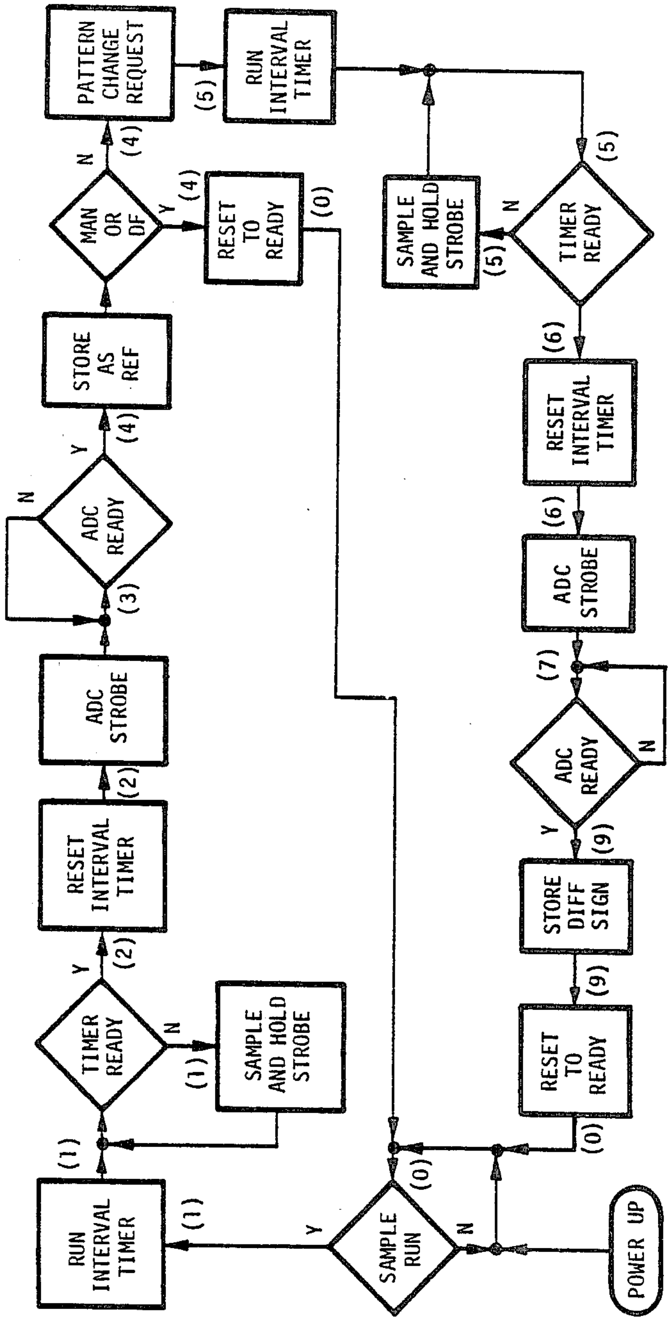
FIG. 14 is a sample timer and comparator process flow diagram.

The sample timer and comparator process flow diagram is illustrated in FIG. 14. This diagram illustrates the process flow of sampling the evaluation term, converting the sample to a 12 bit binary word by the ADC, and storage as a reference. If in automatic mode, a full sample timer cycle is requested by instructing the sample timer to run. The interval timer is run and the first sample is taken by the sample and hold circuit, changed to a 12 bit binary word by the ADC and stored. The pattern is changed, a second sample taken, digitized, and compared digitally to the first. The sign of the difference is stored to indicate improvement or not of the signal environment. The sample timer process is actuated during times T(4) to T(7) of the main process flow diagram, FIG. 13. If in manual or DF control modes, no binary comparison is required of successive samples. Only one sample is made each sample cycle, to provide input for the binary-to-decimal conversion for the amplitude LED display.

The system clock and varitimer circuit is identical to RTSNAP I. The system clock is part of two two-input quad gates, and is configured as a free-running multivibrator circuit whose output pulse rate is determined by two resistors and a capacitor. The system clock provides the basic timing for all manula and automatic sequences. The remaining circuitry is the varitimer circuit, which is the VRPC and delay rate controlling device in the DF and manual mode. The rate at which the clock varies is determined by gates and a variable rate counter/divider circuit. The varitimer reset and start-continue pulse from the control processor are derived from initial turn-on reset, the four-way joystick, and automatic mode operation as illustrated in the logic flow diagram, FIG. 13. Since an operator may decide to go from automatic control to manual control at any time in the automatic cycle, the varitimer reset is required to initialize the timer for manual control.

The controls and power circuit provides the interface between the manual front panel controls and the primary power input, and the control processor. The front panel Power ON switch applies +25 Vdc primary power to +15 Vdc and $V_{DD}$ regulators, and also to a dc to dc converter for the −9 Vdc regulated output. The converter eliminates the requirement for a negative primary power requirement. The COSMOS logic and RF switching circuits require the +15 Vdc supply and the memory circuits require $V_{Dd}$ (nominally 30 15 Vdc) and −9 Vdc. An initial reset is generated by a differentiating circuit and set/reset flip-flop. The four-way joystick control positions, VRPC increasing or decreasing amplitude, and the delay line increasing or decreasing delay manual control instructions are gated through a quad latch. The front panel manual Antenna Advance is also processed through a latch by the Read Controls command from the central processor.

The evaluation term and ADC circuits also provide an interface between the front panel operator controls and the control processor. The operator selects the control mode of operation with a four-way rotary switch for the automatic modes Modem and Power Leveling (PL), or for the manual control modes Direction Finding (DF) and Manual. The selected mode is not activated until the operator presses the MODE SELECT pushbutton to gate the chosen mode of operation through a quad latch. The evaluation term consistent with the chosen mode of operation is selected by an analog switch. Video term is used for Manual, DF, and PL mode control. The modem term, a measure of S/I, is used for Modem control. The chosen evaluation term is retained in a sample and hold circuit by a sample and hold circuit by a sample strobe, and then converted to a 12 bit binary word representing the amplitude level of that sample. This digitized evaluation term is applied to the amplitude display circuits to indicate the received signal level, and also to the sample binary comparator circuit for automatic control mode evaluation of improvement or not over a previous reference sample.

The sample timer and binary comparator circuit consists of the sample sequencer that controls the sample-and-hold capacitor integrate and hold time, and the timing controls for the ADC strobe pulses that gate the evaluation term reference and compare samples, after an antenna pattern change. The digitized reference sample from the ADC is stored in three quad latches. The second compare sample from the digitized ADC output is applied directly to three four-bit full adders, and the binary difference is then stored in an improvement flip-flop. If the first reference sample is greater than the second, the output indicates no improvement. Improvement is indicated from the improvement flip-flop for the opposite sample difference.

The control processor controls the sequence of events for the antenna delay lines and the VRPC antenna array pattern adjustment in the manual, DF, and automatic modes of operation. A main control sequencer provides the basic timing for the control circuits through the process flow cycles, FIG. 13, from T(0) to T(9) for all modes of control. The varitimer clock input to the main sequencer is used during the manual or DF mode, while the automatic control modes use the system clock for initial timing. The Sample Ready input to the main sequencer causes a pause in the sequence while the evaluation term is sampled and converted to its digital 12 bit word by the ADC. An Antenna Advance pulse from the front panel control logic clocks two-stage antenna counters in manual or automatic control modes. Manual or automatic modes select the binary antenna counters, through a select gate, to a binary antenna address decoder. The antenna address is selected by the front panel ANTENNA ADVANCE pushbutton in manual control mode, and is sequentially advanced as illustrated in the process flow, FIG. 13, for the automatic modem or PL control modes. The limits of the delay line and VRPC control the change of direction, change of function, and antenna advance for the four modes of operation. The basic manual and automatic controls are gated together with the main sequencer timing T(4) and T(7), in order to generate the logic commands during the sample period that will produce incremental change in the VRPC, antenna delay lines or angle display counter.

The four antenna delay lines and the delay pairs used in the VRPC are identical in RF and digital circuitry and in construction. The delay lines are controlled from a seven-stage up/down counter on the primary delay line. The second VRPC delay line of the VRPC module pair is driven by the inverted output of the VRPC seven-stage counter. The delay lines receive inputs from the control processor for antenna element address, direction of delay count, preset, and clock pulses. Feedback logic provides recycle and limit detection for the seven-stage counter. A limit pulse is applied to the control processor for change of direction, function, and antenna address selection. See FIG. 13 for delay line antenna address process flow when an antenna delay line or VRPC is in limit. The PIN diode DPDT switch transistor driving circuits, with constant current bias source, are identical to RTSNAP I.

Figure 15:
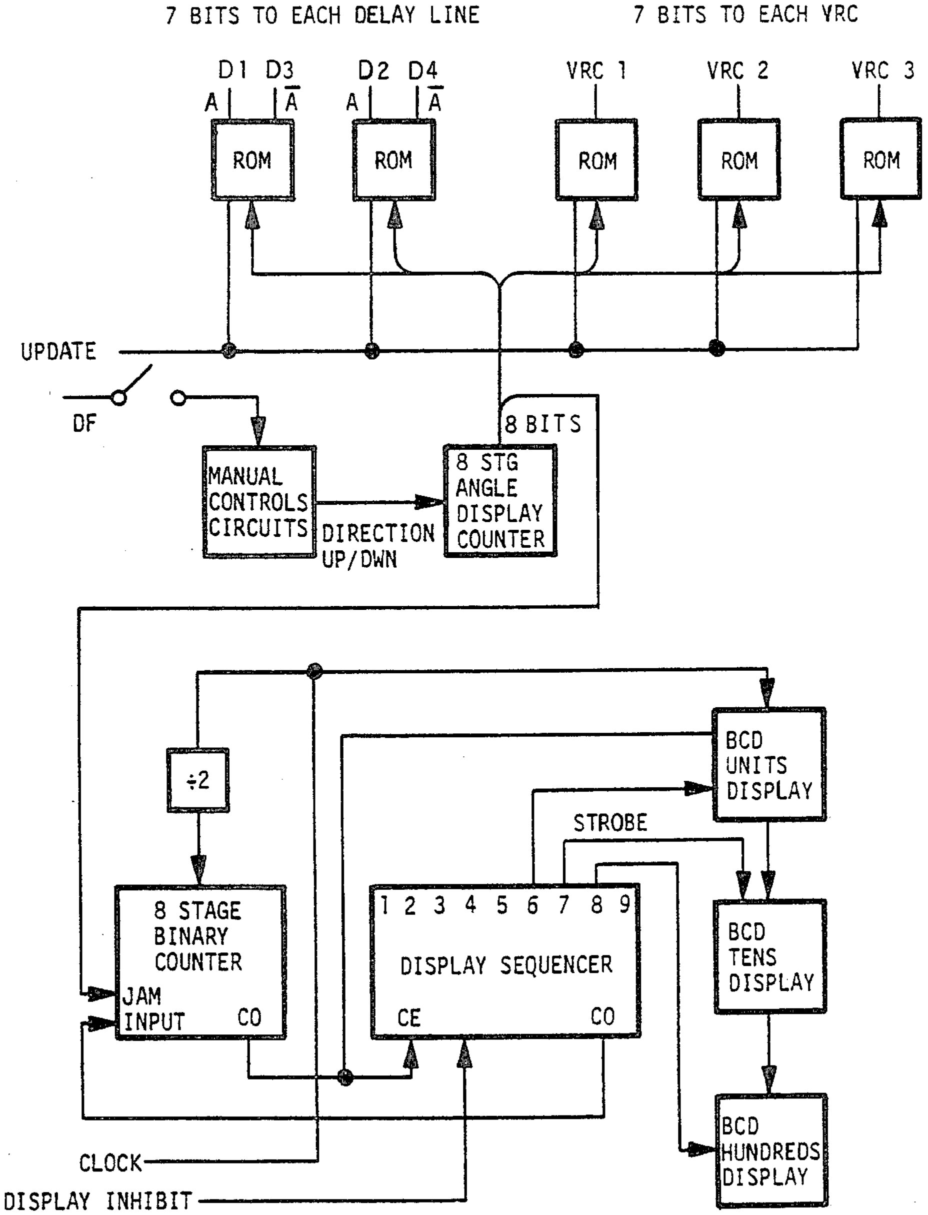
FIG. 15 is a block diagram of the RTSNAP II angle display circuit.

For RTSNAP II, more complex relations exist in direction finding (DF) than for RTSNAP I, since three independent nulls may be generated by the four-element combination, permitting simultaneous nulling of up to three independent interference sources. To display interferer positions when simultaneous nulls occur requires a separate DF control mode. A fixed cardioid composite antenna pattern is generated in the DF mode by pre-programmed memory circuits that control the four antenna delay lines and three VRPC settings to produce a 360 degree null angle visual display indication in 2 degree increments, FIG. 15. The DF mode is a manual operator control mode, which is activated when the operator rotates the front panel mode selector to DF and presses the MODE SELECT pushbutton. When in the DF mode, the operator controls the positioning of the fixed cardioid pattern's null by means of a left-right motion of the four-way front panel joystick function control switch. A Left control direction is for decreasing angle, and a Right control direction is for increasing angle direction. The operator can then use the RTSNAP II front panel amplitude indicator in conjunction with receiver aural output to null the interferer. The same varitimer control circuits that are used in the manual nulling mode are also used in the DF mode to allow the operator the capability of rotating the cardioid null through 360 degrees rapidly for initial acquisition of an interferer, or to position the null, a step at a time, in 2 degree increments for final acquisition. An interferer's angular position is displayed in degrees on a front panel three-digit LED display. The angle display is updated continuously, but illuminated only in the DF mode. When leaving the DF mode, the nulling pattern must be reestablished in either manual, modem, or power leveling null control modes.

The DF control, storage, and display circuits. When the operator presses the front panel MODE SELECT pushbutton in the DF mode, the eight-stage up-down counter is preset to output an eight-bit word representing the angular positioning of the cardioid null to the antenna delay line and VRPC memory circuits. The read-only-memories (ROM) are pre-programmed in 2 degree angle increments for a 360 degree rotation of the DF cardioid antenna pattern. The delay line ROM controls alternate pairs of antenna delay lines, with the ROM A4 output going to antenna delay line D1 and its compliment output to D3, and the ROM output going to antenna delay line D2 with its compliment output to D4. Alternate pairs of antenna delay lines in the four-antenna array are, therefore, controlled differentially. The three memories are also programmed to produce the cardioid pattern and its rotation in 2 degree increments. VRPC1 is common to antenna delay line D1 and D2, VRPC2 is common to D3 and D4, and their outputs are combined through VRPC2, FIG. 7. Counters can be continuously recycled through 360 degrees by the feedback recycle logic, and the controls need not be reversed when the count limit is reached.

The eight-bit output from the angle counter is also applied to the display circuits, and to the jam inputs of the parallel-to-serial counter. The remaining display circuit description and operation is very similar to the RTSNAP I display circuits with the exception of the clock divide-by-two circuit, which is required to accommodate the digital-to-analog conversion for 2 degree angle resolution. When the operator presses the front panel DF MODE SELECT pushbutton, a display inhibit pulse is removed from a display sequencer nine-stage counter. The display sequencer begins counting with the system clock once the inhibit has been removed, and sets a gate to prepare for the sequential readout of the null angle setting. After a count of four, a Carry Out pulse from the display sequencer jams the eight input lines from the ROM's storage latch into the eight-stage parallel-to-series counter. The display sequencer will pause until the binary-parallel-to-series counter counts down to all zeros from its present jam input representing the angle. A carry-out pulse from the parallel-to-series counter steps the display sequencer one count, and then the counter recycles to its maximum count and counts down again to all zero. As the eight-stage parallel-to-series counter counts down to zero, the clock also counts the three cascade binary-to-decimal counters up by the same count, but at twice the rate. When a Carry Out pulse occurs for all zeros in the counter output, an inhibit pulse is generated in inhibit further counting of the binary-to-decimal decoders. The binary-to-decimal decoder is not needed for the three-digit LED angle display, and is used only in the amplitude display circuit. For the next three cycles of the eight-stage counter, the display sequencer is advanced three times, to strobe the BCD decoder decode bus DE first in units, then tens, then in hundreds of degrees. This strobing conserves power consumed by the LED display, and it is at a fast enough rate that the display appears to be continuous. The null angle LED display in continuously updated during the DF mode, and is not operative during the manual, modem, or power leveling control modes.

Figure 16:
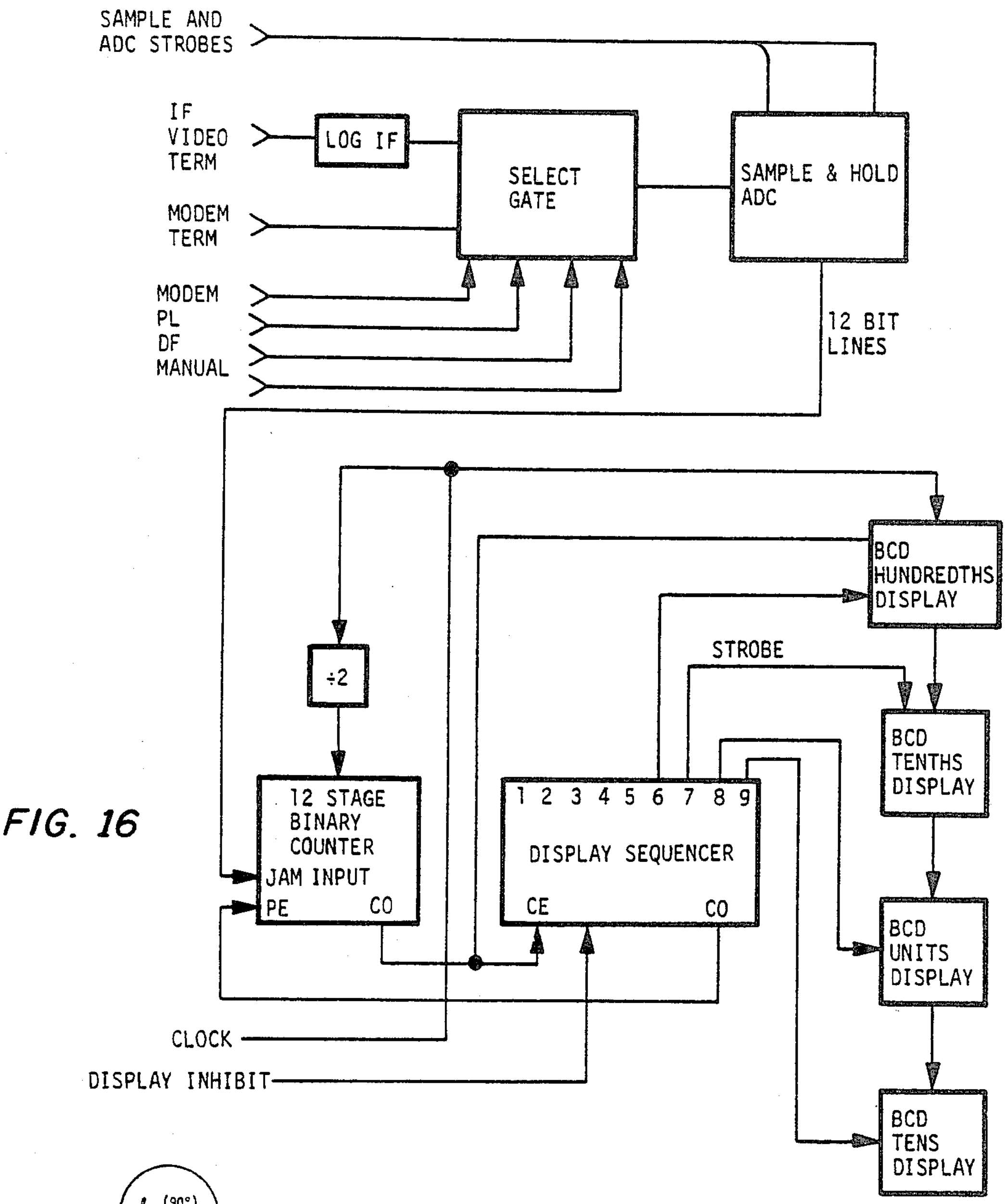
FIG. 16 is a block diagram of the RTSNAP II amplitude display circuit.

A similar digital display circuit is used for amplitude display circuit. The 12 bit binary word representing the received input level from the ADC, is applied to a 12-stage parallel-to-series counter shown in FIG. 16. The rest of the display circuit operation is similar to that just described in the angle display circuit description. In the amplitude display circuit operation the ADC Ready performs as the amplitude binary-to-decimal con-converter and LED display are added to provide a four-digit LED display to 99.99 dB, with 0.02 dB amplitude resolution. The LED display reads directly in dB, and covers the total receiver input dynamic range with no amplitude offset requirement. The amplitude display is actuated by an operator front panel DISPLAY ON-OFF switch. The received amplitude level in dB can be displayed during any of the four selected modes of operation; Manual, DF, PL, or Modem.

VARIABLE PHASE AND AMPLITUDE CIRCUITS

This section describes the variable phase and amplitude control for the antenna array elements for both the VHF and UHF systems. See my patent application, Ser. No. 180,554 on a Switched Delay Line for Steerable Null Antenna System, which is incorporated by reference, for more detail.

Figure 17:
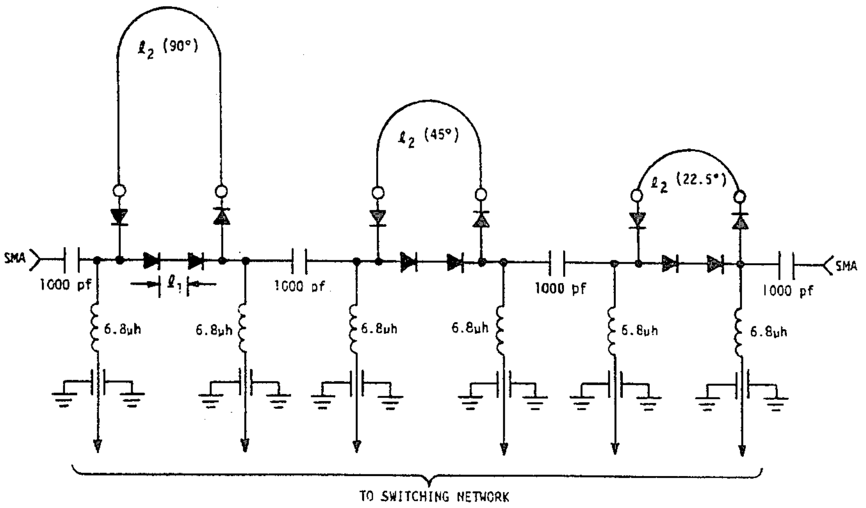
FIG. 17 is a schematic diagram of a 3-bit phase shifter.

The delay lines used in the variable phase and amplitude circuits are each a seven-bit binary switched delay line. The switching devices are PIN diodes, such as Unitrode type 7906E. A three-bit delay line is shown schematically in FIG. 17. Each element (bit) comprises a principal section of transmission line with a PIN diode in series at each end, and a short section of line for the "off" state linewise having two PIN diodes in series, one at each end. The "on" section diodes are oriented in one direction, and the "off" diodes in the opposite direction. For each element there are two 6.8-microhenry inductors connecting the diodes to a source of bias current for switching the diodes in response to signals from the controller. The elements are separated by 1000-picofarad capacitors. The lengths of the lines are related in a binary manner so that the effective difference in delay between the "on" and "off" states for each element is one half that of the preceding element. The lines may be either stripline or microstrip.

The variable-ratio power combiner (VRPC) provides a means of amplitude control for RTSNAP I and RTSNAP II vector multi-RF circuits. This device offers broadband, reciprocal receive/transmit capability at high power levels and minimum insertion loss. The RF circuit configuration for the RTSNAP II vector (30 to 80 MHz) and RTSNAP II (225 to 400 MHz) variable-ratio power combiner is nearly identical, with the four-antenna-element array RTSNAP II consisting of two combined RTSNAP I designs. The switched delay line lengths and two hybrid couplers are scaled to accommodate the RTSNAP I and RTSNAP II operating frequencies.

The VRPC provides continuous variation of RF signal power between two output ports (transmit mode) in any desired ratio. The device is bilateral and can also be used to combine two signals with a variable combining ratio to a single output port (receive mode). Therefore, the VRPC can be used in a RTSNAP receive or transmit mode of operation as illustrated in a basic circuit configuration of FIG. 5. This basic circuit consists of two-antenna input quadrature coupler H1, two variable delay lines DL3 and DL4, and a 0/180 degree hybrid combiner H2 for a single output to the transceiver. The variable power division is obtained by controlling the phase of one half of the incoming signal by delay line DL3 with respect to the RF energy in delay line DL4. In the receive mode, control of the variable delay lines varies the phase relationship of the two quadrature signals from ports HIC and HID before they arrive at ports H2A AND H2B. The phase relationship of the energy arriving at H2A and H2B terminals determines the ratio of power coupling to the output port H2D. Output amplitude at H2C and H2D of H2 will vary as a sine or cosine function with incremental variations of delay line DL3 with respect to DL4. Hybrid port H2C is normally terminated in a 50-ohm load as an isolation port. In the transmit mode, the high-level transmit energy enters port H2D and is divided equally in amplitude, 180 degrees out of phase, at ports H2A and H2B. Delay lines DL3 and DL4 again control the phase relationship of the two RF signals arriving at quadrature inputs H1C and H1D of hybrid H1. This phase relationship of the two signals at H1C and H1D determines the ratio of power coupling to each antenna port. This basic VRPC design configuration is used for both RTSNAP I and RTSNAP II as a means of amplitude control in each antenna leg. Variable delay lines DL3 and DL4 are configured as seven-bit PIN diode binary switched line phase shifters or time delay devices with phase shift proportional to frequency. For the RTSNAP application, if the binary delay line bits are switched in equal and opposite delay increments, the output differential phase is kept constant with switched delay line variations.

I claim:

1. A steerable null antenna processor system for receiving desired wave energy signals from at least one angular region of space within the area covered by the system and for suppressing interfering signals from at least one other angular region, using antenna means having at least first and second antenna elements; said processor system comprising:

nulling means coupled between said antenna elements and a common port for supplying said desired wave energy signals to said common port;

said nulling means comprising phase means and amplitude means, both the phase means and the amplitude means being adjustable in incremental steps and having control inputs, operative in response to control signals at the control inputs to adjust respectively the phase and amplitude values of the nulling means; the amplitude means being a variable ratio combiner comprised of a quadrature hybrid, a sum-difference hybrid, and two adjustable delay lines between said hybrids;

digital controller means having clock means, sample storage means, comparison means, feedback input means, and phase and amplitude memory means having connections to said control inputs of the phase and amplitude means respectively; there being apparatus between said common port and the feedback input means which supplies feedback signals containing a representation of the level of the interfering signal at the common port; the clock means supplying clock signals to provide successive cycles, the comparison means being connected and operative during each cycle to compare a feedback signal from the feedback input means to a previous sample thereof stored in said sample storage means to indicate improvement or no improvement, and to supply said control signals via said memory means to said nulling means to make an appropriate adjustment for steering at least one null to the interfering signals.

2. A system according to claim 1, for receive-transmit operation, wherein said nulling means is reciprocal for receiving energy from said antenna elements via said common port for use by a radio receiver, and alternately for transmitting energy from a radio transmitter via said common port to said antenna elements, with substantially the same antenna pattern for receive and transmit operation.

3. A steerable null antenna processor system for receiving wave energy signals from at least one angular region of space within the area covered by the system and for suppressing interfering signals from at least one other angular region, using antenna means having at least first and second antenna elements; said processor system comprising:

nulling means coupled between said antenna elements and a common port for supplying said desired wave energy signals to said common port, said nulling means being comprised of phase means and amplitude means, the amplitude means being a variable ratio combiner comprising a quadrature hybrid, a sum-difference hybrid, and two variable delay lines which are adjustable in incremental steps, each hybrid having a first, a second, a third and a fourth port, with one of said delay lines connected from the third port of a first of said hybrids to the first port of a second of said hybrids, and the other said delay line connected from the fourth port of the first hybrid to the second port of the second hybrid, said common port being the fourth port of the second hybrid, and the third port of the second hybrid being an isolation port connected to a termination impedance; wherein said phase means comprises two delay lines which are each incrementally adjustable, one connected from the first antenna element to the first port of said first hybrid, and the other connected from the second antenna element to the second port of the first hybrid;

memory means to store digital signals for setting said delay lines to selected steps, comprising phase memory means connected to control inputs of the delay lines of said phase means, and amplitude memory means connected to control inputs of the delay lines of said amplitude means, so that the two delay lines of the amplitude means are controlled one with the signals in the amplitude memory and the other with the complement thereof so that they are switched with equal and opposite delay increments and the output differential phase is kept constant with switched delay line variations;

and control means to determine the value of the digital signals in said memory means to thereby determine the directions of said angular regions.

4. A system according to claim 3, for receive-transmit operation, wherein said nulling means is reciprocal for receiving energy from said antenna elements via said common port for use by a radio receiver, and alternately for transmitting energy from a radio transmitter via said common port to said antenna elements, with substantially the same antenna pattern for receive and transmit operation.

5. A system according to any of claims 1, 2, 3 or 4, wherein said delay lines of the phase means are controlled with either one at its minimum delay setting while the other is set at any step within its range, so that the number of incremental steps is equal to twice that of each one.

6. A system according to claim 3 or 4, wherein said phase and amplitude memories are each an up-down counter.

7. A system according to claim 6, further including null indicator means coupled to said memory means to provide an indication representing the direction and depth of a null.

8. A system according to claim 1, 2, 3 or 4, further including null indicator means coupled to said memory means to provide an indication representing the direction and depth of a null.

9. A system according to claim 1, 2, 3 or 4, in which said delay lines of the phase and amplitude means are each comprised of segments of delay lengths having a binary relation so that each delay line has a number of incremental steps equal to two raised to the power which is the number of segments in that delay line.

10. A system according to claim 9, wherein said delay lines of the phase means are controlled with either one at its minimum delay setting while the other is set at any step within its range;

wherein said phase and amplitude memories are each an up-down counter in which the value is stored as a binary number.

11. A system according to claim 1, 2, 3 or 4, for use with antenna means further having third and fourth elements, the system further comprising second nulling means comprising a second phase means and a second amplitude means coupled to the third and fourth antenna elements, and corresponding in structure to said nulling means coupled to the first and second antenna elements, with a second common port;

third amplitude means corresponding in structure to each of the first and second amplitude means, coupled between the first and second common ports and a third common port for coupling to the radio apparatus;

with second phase memory means connected to control the second phase means, and second and third amplitude memory means connected respectively to control the second and third amplitude means.

* * * * *